United States Patent
Pudil et al.

(10) Patent No.: US 12,440,612 B2
(45) Date of Patent: Oct. 14, 2025

(54) PH AND BUFFER MANAGEMENT SYSTEM FOR HEMODIALYSIS SYSTEMS

(71) Applicant: MOZARC MEDICAL US LLC, Minneapolis, MN (US)

(72) Inventors: Bryant J. Pudil, Plymouth, MN (US); Martin T. Gerber, Maple Grove, MN (US); David B. Lura, Maple Grove, MN (US); Thomas E. Meyer, Stillwater, MN (US)

(73) Assignee: MOZARC MEDICAL US LLC, Minneapolis, MN (US)

( * ) Notice: Subject to any disclaimer, the term of this patent is extended or adjusted under 35 U.S.C. 154(b) by 0 days.

(21) Appl. No.: 17/974,484

(22) Filed: Oct. 26, 2022

(65) Prior Publication Data

US 2023/0123024 A1    Apr. 20, 2023

Related U.S. Application Data

(63) Continuation of application No. 13/757,792, filed on Feb. 2, 2013, now abandoned.

(60) Provisional application No. 61/735,380, filed on Dec. 10, 2012.

(51) Int. Cl.
*A61M 1/16* (2006.01)
*A61M 1/28* (2006.01)
*A61M 1/34* (2006.01)

(52) U.S. Cl.
CPC ........ *A61M 1/1696* (2013.01); *A61M 1/1605* (2014.02); *A61M 1/287* (2013.01); *A61M 1/3406* (2014.02); *A61M 1/165* (2014.02); *A61M 1/34* (2013.01); *A61M 1/3413* (2013.01); *A61M 1/3437* (2014.02); *A61M 2205/33* (2013.01); *A61M 2205/3324* (2013.01)

(58) Field of Classification Search
None
See application file for complete search history.

(56) References Cited

U.S. PATENT DOCUMENTS

| | | | | |
|---|---|---|---|---|
| 5,891,328 A | * | 4/1999 | Goldstein | B01D 63/081 210/231 |
| 2010/0224492 A1 | * | 9/2010 | Ding | A61M 1/1674 204/632 |
| 2011/0168614 A1 | * | 7/2011 | Pouchoulin | A61M 1/3437 210/134 |
| 2012/0258545 A1 | * | 10/2012 | Ash | A61M 1/3612 210/85 |
| 2012/0273354 A1 | * | 11/2012 | Orhan | A61M 1/1605 204/627 |

* cited by examiner

*Primary Examiner* — Jonathan M Peo

(57) ABSTRACT

Systems and methods for managing the pH of a dialysate fluid during hemodialysis therapy. The systems and methods adjust dialysate pH and buffer concentration to generate a predetermined total bicarbonate buffer concentration in a dialysate entering a dialyzer. The systems and methods generate a pH-modifying fluid and selectively add the pH modifying fluid to the dialysate in order to accurately control the total bicarbonate buffer concentration in the dialysate entering the dialyzer.

17 Claims, 16 Drawing Sheets

PH AND BUFFER MANAGEMENT SYSTEM FOR HEMODIALYSIS SYSTEMS

FIELD OF THE INVENTION

The invention relates to systems and methods for managing the pH of a dialysate fluid during hemodialysis therapy. The invention adjusts dialysate pH and buffer concentration to generate a predetermined total bicarbonate buffer concentration in a dialysate entering a dialyzer.

BACKGROUND

During hemodialysis, the dialysate pH and buffer concentration play a critical role in patient outcomes. The dialysate pH and buffer concentration are specified for a patient based on the acid-base status of the patient. Acidotic patients can be treated by increasing their bicarbonate buffer levels and patients with alkalosis can be treated by decreasing their bicarbonate levels. A method to manage pH and buffer dialysate concentration is especially important with systems that contain a component that may change the pH level and bicarbonate concentration to unknown values. For example, regenerative hemodialysis systems, such as the Recirculating Dialysate System ("REDY" System), contain sorbent materials that release and/or remove hydrogen ions and bicarbonate from the dialysate fluid. The removal and/or addition of hydrogen ions and bicarbonate to the dialysate fluid depend on several factors including: patient blood urea level, patient weight, dialysate composition, sorbent properties, etc. Because of this, it becomes difficult to predict the changes in dialysate pH and bicarbonate concentration that will occur during a hemodialysis session. Therefore, there is a need for systems and methods that can control the pH and bicarbonate concentration of the dialysate. There is also a need for systems and methods for managing pH and bicarbonate that minimize system size and weight and do not require large amounts of fluid.

SUMMARY OF THE INVENTION

The invention is directed toward a system having a dialysate flow loop for circulating a dialysate through a dialyzer wherein acid or base equivalents are added to the dialysate during operation of the dialysate flow loop and a urea sensor that measures or allows for the calculation of urea content of the dialysate in at least one portion of the dialysate flow loop, and an infusate system wherein the infusate system can be configured to add a bicarbonate buffer component to the dialysate. In any embodiment, the infusate system can be configured to add unbuffered sodium bicarbonate. The system can also use a controller for calculating an amount of the bicarbonate buffer component for addition to the dialysate to generate a predetermined total bicarbonate buffer concentration in the dialysate entering the dialyzer.

In any embodiment, a urea sensor can be provided to allow for the determination of the urea content of a dialysate flowing to a dialysate regeneration unit. A controller can be provided having a processor to determine the bicarbonate buffer composition of a dialysate resulting from removal of urea content from the dialysate by contacting or processing with the dialysate regeneration unit and can also optionally include a sodium management system for adjusting the sodium ion concentration of the dialysate. Moreover, in any embodiment, the determination of the bicarbonate buffer composition can allow for a controlled amount of bicarbonate buffer to be added to the dialysate to form a dialysate with a predetermined concentration of a bicarbonate buffer prior to use in the dialyzer.

In any embodiment, the system for infusing a buffer into a dialysate can be controlled compliant. In any embodiment, the system for infusing a buffer into a dialysate can selectively meters fluid into and out of the dialysate flow loop. In any embodiment, the system for infusing a buffer into a dialysate con selectively meters fluid into and out of the dialysate flow loop using any one of a control pump, a water pump, a salination pump, an acid concentrate pump, a replacement fluid pump, and combinations thereof. In any embodiment, the system for infusing a buffer into a dialysate can provide for bi-directional flow.

A system for modifying a pH of a dialysate is also provided having a dialysate flow loop for circulating a dialysate through a dialyzer wherein acid or base equivalents can be added to the dialysate during operation of the dialysate flow loop. The system also can optionally utilize a urea sensor that measures or allows for the calculation of urea content of the dialysate in at least one portion of the dialysate flow loop; a pH-buffer management system for adding or generating a pH-buffer modifying solution to the dialysate wherein the pH-buffer management solution has a different pH from the dialysate; and a controller for calculating an amount of the pH-buffer modifying solution for addition to the dialysate to adjust the dialysate to a predetermined pH.

In any embodiment, a controller can receive data from a pH sensor for the pH of a dialysate in a first portion of the dialysate flow loop. In other embodiments, a controller can receive data from a urea sensor based at least in part upon a urea content of the dialysate in a second portion of the dialysate flow loop. In certain embodiments, the controller can receive data from both the pH and urea sensor. Having received information on the pH and urea concentration from either or both of the pH and/or urea sensors, the controller can provide instructions to the pH-buffer management system or the infusion system for any necessary adjustments to the dialysate bicarbonate concentration.

In any embodiment, a system for modifying a pH of a dialysate can utilize a dialysate flow loop for circulating a dialysate through a dialyzer, wherein acid or base equivalents are added to the dialysate during operation of the dialysate flow loop. A urea sensor measures or allows for the calculation of urea content of the dialysate in at least one portion of the dialysate flow loop. A pH-buffer management system adds or generates a pH-buffer modifying solution to the dialysate, wherein the pH-buffer modifying solution has a different pH from the dialysate, and a controller for calculates an amount of the pH-buffer modifying solution for addition to the dialysate to adjust the dialysate to a predetermined pH and bicarbonate concentration.

In any embodiment, a controller controls the bicarbonate concentration of a dialysate in a first portion of the dialysate flow loop based at least in part upon a urea content of the dialysate in a second portion of the dialysate flow loop.

In any embodiment, the system for modifying a pH of a dialysate can be controlled compliant. In any embodiment, the system for modifying a pH of a dialysate can selectively meters fluid into and out of the dialysate flow loop. In any embodiment, the system for modifying a pH of a dialysate can selectively meters fluid into and out of the dialysate flow loop using any one of a control pump, a water pump, a salination pump, an acid concentrate pump, a replacement fluid pump, and combinations thereof. In any embodiment, the system for modifying a pH of a dialysate can provide for bi-directional flow.

BRIEF DESCRIPTION OF THE DRAWINGS

Throughout the figures and the specification, components with the same numbers in the FIGS. refer to the same components.

DETAILED DESCRIPTION

Definitions

Figure 1:
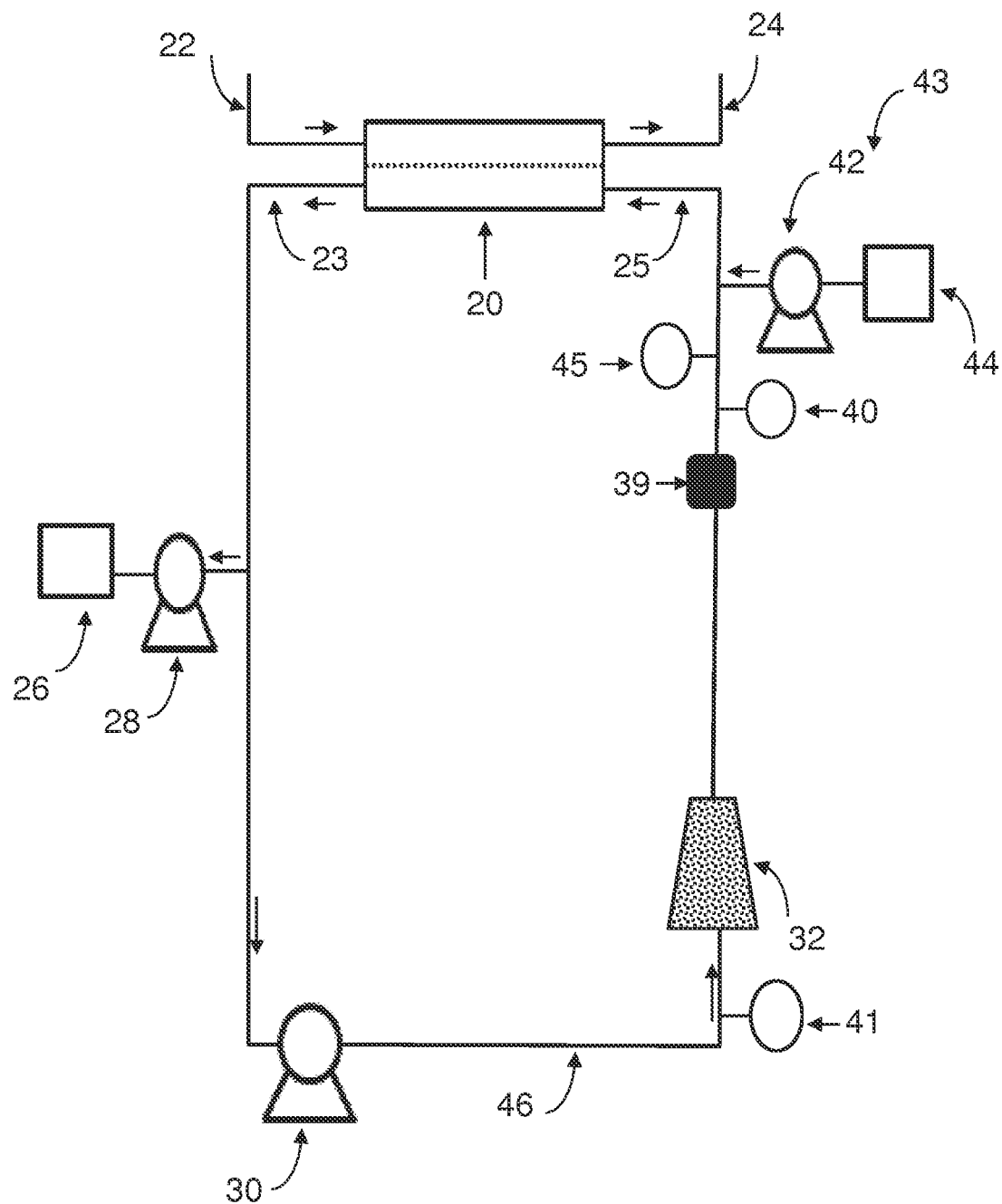
FIG. 1 is a flow diagram of a dialysate regeneration system with a controlled compliant dialysate circuit and a pH and buffer management system.

Unless defined otherwise, all technical and scientific terms used herein generally have the same meaning as commonly understood by one of ordinary skill in the relevant art. The definitions provided herein should not be rigidly construed without taking into account the context and other ascribed meanings provided, or by their use, in other parts of the specification, claims, and drawings.

The articles "a" and "an" are used herein to refer to one or to more than one (i.e., to at least one) of the grammatical object of the article. By way of example, "an element" means one element or more than one element.

The term "acid or base equivalents" refers to an equivalent acid or base donating or accepting an equal number of moles of hydrogen or hydronium ions per mole of the acid to which the equivalent acid is being equated, or mole of hydroxide ions to which the equivalent base is being equated.

The term "cation infusate pump" historically known as an "acid concentrate pump" in dialysis systems refers to a pump that serves the function to move or control the flow of a fluid to and/or from a reservoir having a substance that contains at least one cation species, such as calcium, magnesium and potassium ions. In the present invention, the historically used term of "acid concentrate pump" is used.

The term "acid feed" refers a state of fluid communication that enables an acid solution to be obtained from an acid source and connected or feed into a receiving source or flow path.

An "acid" can be either an Arrhenius acid, a Brønsted-Lowry acid, or a Lewis acid. The Arrhenius acids are substances or fluids which increase the concentration of hydronium ions (H3O+) in solution. The Brønsted-Lowry acid is a substance which can act as a proton donor. Lewis acids are electron-pair acceptors.

The term "activated carbon" may refer to a porous carbon material having a surface area greater than 500 m2 per gram. Activated carbon can be capable of absorbing several species including heavy metals such as lead, mercury, arsenic, cadmium, chromium and thallium among others, oxidants such as chlorine and chloramines, fluoride ions, and waste species such as phosphate and certain nitrogen-containing waste species such as creatinine and uric acid.

The terms "administering," "administer," "delivering," "deliver." "introducing," and "introduce" can be used, in context, interchangeably to indicate the introduction of water or a dialysate having an altered concentration of at least one component, including electrolytes and alkali and/or alkali earth ions, to a patient in need thereof, and can further mean the introduction of water, any agent or alkali and/or alkali earth ions to a dialysate or dialysis circuit where such water, agent or alkali and/or alkali earth ion will enter the blood of the patient by diffusion, transversal of a diffusion membrane or other means.

The term "air trap" refers to a structure for separating a gas from a mixture of a gas and a liquid or any other separation means known in the art. An air trap can include a hydrophobic membrane for allowing gases to pass and for preventing the passage of water.

The term "albumin sieving coefficient" can be used to describe the amount of albumin that will cross a membrane.

The terms "ammonia sensing module" and "ammonia detector" refer to a unit that performs all or part of the function to detect a predetermined level of, or measure a concentration of, ammonia and/or ammonium ions in a fluid.

The term "anion exchange membrane" refers to a positively charged membrane, which allows negatively charged ions (anions) to pass through.

The term "anticoagulant" is a substance that prevents or delays the clotting of blood, such as heparin. Fragmin®, and sodium citrate.

The term "atmospheric pressure" refers to the local pressure of air in the environment in proximity to the system at the time that the system is operating.

The term "base concentrate pump" refers to a device that performs work on a fluid solution to cause fluid flow to control the volume transfer of a basic or alkaline solution into a circuit.

The term "base concentrate reservoir" refers to a vessel or container, optionally accessible by a pump that contains a variable amount of a basic or alkaline fluid solution.

The term "base module" refers to a basic unit of an apparatus for hemodialysis, hemodiafiltration, or hemofiltration that incorporates one or more fluid pathways. Exemplary, non-limiting components that can be included in the base module include conduits, valves, pumps, fluid connection ports, sensing devices, a controller and a user interface. The base module can be configured to interface with reusable or disposable modules of the apparatus for hemodialysis, hemodiafiltration, or hemofiltration to form at least one complete fluid circuit, such as a dialysis, cleaning, disinfection, priming or blood rinse back circuit.

A "base" can be either a substance that can accept hydrogen cations (protons) or more generally, donate a pair of valence electrons. A soluble base is referred to as an alkali if it contains and releases hydroxide ions (OH—) quantitatively. The Brønsted-Lowry theory defines bases as proton (hydrogen ion) acceptors, while the more general Lewis theory defines bases as electron pair donors, allowing other Lewis acids than protons to be included.[1] The Arrhenius bases act as hydroxide anions, which is strictly applicable only to alkali.

The term "base feed" refers a state of fluid communication that enables a base solution to be obtained from a base source and connected or feed into a receiving source or flow path.

The term "bicarbonate buffer component" refers to any composition contain bicarbonate (HCO3−) ion or a conjugate acid of bicarbonate ion in any amount, proportion or pH of the composition. The bicarbonate buffering system is an important buffer system in the acid-base homeostasis of living things, including humans. As a buffer, it tends to maintain a relatively constant plasma pH and counteract any force that would alter it. In this system, carbon dioxide (CO2) combines with water to form carbonic acid (H2CO3), which in turn rapidly dissociates to form hydrogen ions and bicarbonate (HCO3−) as shown in the reactions below. The carbon dioxide-carbonic acid equilibrium is catalyzed by the enzyme carbonic anhydrase; the carbonic acid-bicarbonate equilibrium is simple proton dissociation/association and needs no catalyst.

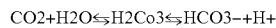

Any disturbance of the system will be compensated by a shift in the chemical equilibrium according to Le Chatelier's principle. For example, if one attempted to acidify the blood by dumping in an excess of hydrogen ions (acidemia), some of those hydrogen ions will associate with bicarbonate, forming carbonic acid, resulting in a smaller net increase of acidity than otherwise.

The term "bicarbonate buffer concentrate" refers to a bicarbonate (HCO3−) buffer component composition at a higher concentration than found at normal physiological levels that can be used to for instants to readjusted the pH of the dialysate (see also definition of bicarbonate buffer component relating to its use).

The term "bicarbonate cartridge" refers to a container that can be a stand-alone container or alternatively can be integrally formed with an apparatus for hemodialysis, hemodiafiltration, or hemofiltration. The bicarbonate cartridge can store a source of buffering material, such as sodium bicarbonate, and can be configured to interface with at least one other functional module found in systems for hemodialysis, hemodiafiltration, or hemofiltration. For example, the bicarbonate cartridge can contain at least one fluid pathway and include components such as conduits, valves, filters or fluid connection ports. The bicarbonate cartridge can be disposable or be consumable wherein the cartridge is recharged upon depletion. Specifically, the term "bicarbonate consumables container" refers to an object or apparatus having or holding a material in solid and/or solution form that is a source of bicarbonate, such as sodium bicarbonate, that is depleted during operation of the system. The object or apparatus may be single use, or may be replenished and used multiple times, for example, by refilling the object to replace the consumed material.

The term "bicarbonate feed" refers to fluid solution introduced into part of the dialysis or ultrafiltrate system. For example a "bicarbonate feed" is a conduit that contains a bicarbonate buffer concentrate that is used to readjust the pH of the dialysate.

The term "bidirectional pump" refers to a device configured to perform work on a fluid to cause the fluid to flow alternatively in either of two opposing directions.

A "biocompatible material" is a material that has the ability to interface with living biological tissues with an acceptable host response in any of specific medical systems, methods of treatment or delivery contemplated herein. The biocompatible material can consist of synthetic, natural or modified natural polymers intended to contact or interact with the biological systems during application of any of the inventions contained herein.

The term "blood access connection" refers to a junction or aperture through which the blood of a subject is conveyed to or from an extracorporeal circuit. Commonly, the blood access connection is made between a terminal end of a conduit of an extracorporeal circuit and the terminal end of a catheter or fistula needle that is distal to the subject receiving therapy. A subject may have more than one blood access connection when receiving therapy. In the case of two blood access connections they can be referred to as an arterial blood access connection and a venous blood access connection.

The term "blood solute" refers to a substance dissolved, suspended, or present in blood or dialysate.

The term "bolus" refers to an increase (or at times a decrease) of limited duration in an amount or concentration of one or more solutes, for example sodium, glucose and potassium, or a solvent, for example water, such that the concentration of a solution is changed. The term "bolus"

includes delivery of solute and/or solvent to the dialysate fluid path such that it is delivered to the blood of a subject via diffusion and/or convection across a dialysis membrane such that the amount or concentration in the subject is increased or decreased. A "bolus" may also be delivered directly to the extracorporeal flow path or the blood of a subject without first passing through the dialysis membrane.

The term "buffer conduit flow path" refers to a fluid flow path in fluid communication with a stored source of a buffering material, such as bicarbonate.

The term "buffer source" refers to a stored material, such as bicarbonate, acetate or lactate that provides buffering.

The terms "buffer source container" and "buffer source cartridge" refer to objects that have or hold one or more materials, in solid and/or solution form, that are a source of buffering, for example a bicarbonate, a lactate, or acetate; and the object further having at least one port or opening to allow at least a portion of the buffering material to be released from the object during operation of the system.

The term "blood based solute monitoring system" refers to a system for monitoring a substance dissolved or suspended or present in blood or dialysate.

The term "blood rinse back" refers to returning the blood from a dialyzer and/or extracorporeal circuit to a subject, normally at conclusion of a therapy session and prior to disconnecting or removing the subject's blood access connection or connections. The procedure can include conveying a physiologically compatible solution through the extracorporeal circuit to push or flush the blood from the extracorporeal circuit to the subject via the subject's blood access connection or connections.

The terms "bypass circuit" "bypass conduit," "bypass flow path," "bypass conduit flow path" and "bypass" refer to a component or collection of components configured or operable to create an alternate fluid pathway to convey a fluid around one or more other components of a fluid circuit such that at least a portion of the fluid does not contact or pass through the one or more other components. At times the term "shunt" may be used interchangeable with the term "bypass." When any of the above "bypass" terms listed in this paragraph are used in context as being part of a controlled compliant system, then the relevant referenced "bypass" has the proper characteristics as to operate within a controlled compliant system as defined herein.

The term "bypass regulator" refers to a component such as valve that can determine the amount of fluid that can pass through a by-pass portion of a fluid circuit.

The term "cartridge" refers to a compartment or collection of compartments that contains at least one material used for operation of the system of the present invention.

The term "cassette" refers to a grouping of components that are arranged together for attachment to, or use with the device, apparatus, or system. One or more components in a cassette can be any combination of single use, disposable, consumable, replaceable, or durable items or materials.

The term "cation exchange membrane" refers to a negatively charged membrane, which allows positively charged ions (cations) to pass. By convention, electrical current flows from the anode to the cathode when a potential is applied to an electrodialysis cell. Negatively charged anions such as chloride ions are drawn towards the anode, and positively charged cations such as sodium ions are drawn towards the cathode.

The term "cation infusate source" refers to a source from which cations can be obtained. Examples of cations include, but are not limited to, calcium, magnesium and potassium. The source can be a solution containing cations or a dry composition that is hydrated by the system. The cation infusate source is not limited to cations and may optionally include other substances to be infused into a dialysate or replacement fluid, non-limiting examples can be glucose, dextrose, acetic acid and citric acid.

The term "cation concentrate reservoir" refers to an object having or holding a substance that is comprised of at least one cation, for example calcium, magnesium, or potassium ions.

The terms "communicate" and "communication" include, but are not limited to, the connection of system electrical elements, either directly or remotely, for data transmission among and between said elements. The terms also include, but are not limited, to the connection of system fluid elements enabling fluid interface among and between said elements.

The terms "conduit," "conduit" or "flow path" refer to a vessel or passageway having a void volume through which a fluid can travel or move. A conduit can have a dimension parallel to the direction of travel of the fluid that is significantly longer than a dimension orthogonal to the direction of travel of the fluid.

The term "chronic kidney disease" (CKD) refers to a condition characterized by the slow loss of kidney function over time. The most common causes of CKD are high blood pressure, diabetes, heart disease, and diseases that cause inflammation in the kidneys. CKD can also be caused by infections or urinary blockages. If CKD progresses, it can lead to end-stage renal disease (ESRD), where the kidneys fail to function at a sufficient level.

The term "citric acid" refers to an organic acid having the chemical formula $C_6H_8O_7$, and may include anhydrous and hydrous forms of the molecule, and aqueous solutions containing the molecule.

The term "cleaning and/or disinfection concentrate" refers to a dry substance, or concentrated solutions containing at least one material for use in cleaning and/or disinfection of an apparatus.

The term "cleaning and/or disinfection solution" refers to a fluid that is used for the purpose of removing, destroying or impairing at least a portion of at least one contaminant. The contaminant may be organic, inorganic or an organism. The fluid may accomplish the purpose by transmission of thermal energy, by chemical means, flow friction or any combination thereof.

The terms "cleaning manifold" and "cleaning and disinfection manifold" refer to an apparatus that has fluid connection ports and one or more fluid pathways, or fluid port jumpers, that, when connected to jumpered ports of a base module, create one or more pathways for fluid to be conveyed between the jumpered ports of the base module. A cleaning manifold may be further comprised of additional elements, for example valves and reservoirs.

The term "container" as used herein is a receptacle that may be flexible or inflexible for holding fluid or solid, such as for example a spent dialysate fluid, or a sodium chloride or sodium bicarbonate solution or solid.

The terms "common container," "common cartridge," or "common reservoir," and the like refer to an object or apparatus that can hold more than one material; however, the time of holding more than one material may or may not necessarily be at the same time. The material(s) may be in solid and/or solution forms and may be held in separate compartments within the object or apparatus.

The term "common fluid inlet port" refers to an opening or aperture through which all fluid first passes to enter an object, apparatus or assembly.

The term "common fluid outlet port" refers to an opening or aperture through which all fluid passes to exit an object, apparatus or assembly.

The terms "communicate" and "communication" include, but are not limited to, the connection of system electrical elements, either directly or remotely, for data transmission among and between said elements. The terms also include, but are not limited, to the connection of system fluid elements enabling fluid interface among and between said elements.

The terms "component" and "components" refer to a part or element of a larger set or system. As used herein, a component may be an individual element, or it may itself be a grouping of components that are configured as a set, for example, as a cassette or a cleaning and/or disinfection manifold.

The term "comprising" includes, but is not limited to, whatever follows the word "comprising." Thus, use of the term indicates that the listed elements are required or mandatory but that other elements are optional and may or may not be present.

The term "concentrate pump" refers to a device that can perform work on a fluid solution to cause the fluid flow and can actively control the transfer of fluid volume such as an infusate or an acid concentrate, base concentrate, or buffer concentrate into a circuit.

The terms "concentrate flow channel," "concentrate flow loop," "concentrate stream," refer to a fluid line in which ion concentration is increased during electrodialysis.

The terms "conditioning conduit flow path" and "conditioning flow path" refer to a fluid pathway, circuit or flow loop that incorporates a source of a conditioning material, for example a sodium salt or bicarbonate.

The term "conditioning flow path inlet" refers to a location on a conditioning flow path where fluid enters the conditioning flow path The term "conditioning flow path outlet" refers to a location on a conditioning flow path where fluid exits the conditioning flow path.

The terms "conductivity meter," "conductivity sensor," "conductivity detector," conductivity electrode or the like, refer, in context, to a device for measuring the electrical conductance of a solution and/or the ion, such as a sodium ion, concentration of a solution. In specific examples, the conductivity sensor, meter, or conductor can be directed to a specific ion such as sodium and be referred to as a "sodium electrode," "sodium sensor," "sodium detector," or "sodium meter."

The term "conductive species" refers to a material's ability to conduct an electric current. Electrolytes are an example of a conductive species in dialysate fluids, such as, but not limited to the presence sodium, potassium, magnesium, phosphate, and chloride ions. A fluid's ability to conduct an electrical current is due in large part to the ions present in the solution. A fluid's ability to conduct an electrical current is due in large part to the ions present in the solution.

The terms "conduit," "circuit." and "flow path" refer to a vessel or passageway having a void volume through which a fluid can travel or move. A conduit can have a dimension parallel to the direction of travel of the fluid that is significantly longer than a dimension orthogonal to the direction of travel of the fluid.

The "connectable" refers to being able to be joined together for purposes including but not limited to maintaining a position, allowing a flow of fluid, performing a measurement, transmitting power, and transmitting electrical signals. The term "connectable" can refer to being able to be joined together temporarily or permanently.

The term "consisting of" includes and is limited to whatever follows the phrase "consisting of." Thus, the phrase indicates that the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The term "consumables" refers to components that are dissipated, wasted, spent or used up during the performance of any function in the present invention. Examples include a quantity of sodium, bicarbonate, electrolytes, infusates, sorbents, cleaning and disinfecting ingredients, anticoagulants, and components for one or more concentrate solutions.

The terms "consumables cartridge" and "consumables container" refer to an object or apparatus having or holding one or more materials that are depleted during operation of the system. The one or more materials may be in solid and/or solution form and can be in separate compartments of the object or apparatus. The object or apparatus may be single use, or may be replenished and used multiple times, for example, by refilling the object to replace the consumed material.

The terms "contact," "contacted," and "contacting" refers, in context, to (1) a coming together or touching of objects, fluids, or surfaces; (2) the state or condition of touching or of immediate proximity; (3) connection or interaction. For example, in reference to a "dialysate contacting a sorbent material" refers to dialysate that has come together, has touched, or is in immediate proximity to connect or interact with any material or material layer of a sorbent container, system or cartridge.

The term "container" as used herein is a receptacle that may be flexible or inflexible for holding fluid or solid, such as for example a spent dialysate fluid, or a sodium chloride or sodium bicarbonate solution or solid, or the like.

The term "contaminant" refers to an undesirable or unwanted substance or organism that may cause impairment of the health of a subject receiving a treatment or of the operation of the system.

The term "control pump," such as for example an "ultrafiltrate pump," refers to a pump that is operable to pump fluid bi-directionally to actively control the transfer of fluid volume into or out of a compartment or circuit.

The terms "control reservoir," "ultrafiltrate reservoir," "solution reservoir," "therapy solution reservoir," and "waste reservoir," as the case may be, refers, in context, to a vessel or container, optionally accessible by a control pump that contains a variable amount of fluid, including fluid that can be referred to as an ultrafiltrate. These reservoirs can function as a common reservoir to store fluid volume from multiple sources in a system. Other fluids that can be contained by these reservoirs include, for example, water, priming fluids, waste fluids, dialysate, including spent dialysate, and mixtures thereof. In certain embodiments, the reservoirs can be substantially inflexible, or non-flexible. In other embodiments, the reservoirs can be flexible containers such as a polymer bag.

The term "control signals" refers to energy that is provided from one element of a system to another element of a system to convey information from one element to another or to cause an action. For example, a control signal can energize a valve actuator to cause a valve to open or close.

In another example a switch on a valve can convey the open or close state of a valve to a controller.

A "control system" consists of combinations of components that act together to maintain a system to a desired set of performance specifications. The control system can use processors, memory and computer components configured to interoperate to maintain the desired performance specifications. It can also include fluid control components, and solute control components as known within the art to maintain the performance specifications.

The terms "control valve" and "valve" refer to a device that can be operated to regulate the flow of fluid through a conduit or flow path by selectively permitting fluid flow, preventing fluid flow, modifying the rate of fluid flow, or selectively guiding a fluid flow to pass from one conduit or flow path to one or more other conduits or flow paths.

The terms "controlled compliant flow path," "controlled compliant dialysate flow path" and "controlled compliant solution flow path" refer to flow paths operating within a controlled compliant system having the characteristic of controlled compliance, or of being controlled compliant as defined herein.

A "controller," "control unit," "processor," or "microprocessor" is a device which monitors and affects the operational conditions of a given system. The operational conditions are typically referred to as output variables of the system wherein the output variables can be affected by adjusting certain input variables.

The terms "controlled compliance" and "controlled compliant" describe the ability to actively control the transfer of fluid volume into or out of a compartment, flow path or circuit. In certain embodiments, the variable volume of fluid in a dialysate circuit or controlled compliant flow path expands and contracts via the control of one or more pumps in conjunction with one or more reservoirs. The volume of fluid in the system is generally constant (unless additional fluids are added to a reservoir from outside of the system) once the system is in operation if the patient fluid volume(s), flow paths, and reservoirs are considered part of the total volume of the system (each individual volume may sometimes be referred to as a fluid compartment). The attached reservoirs allow the system to adjust the patient fluid volume by withdrawing fluid and storing the desired amount in an attached control reservoir and/or by providing purified and/or rebalanced fluids to the patient and optionally removing waste products. The terms "controlled compliance" and "controlled compliant" are not to be confused with the term "noncompliant volume," which simply refers to a vessel, conduit, container, flow path, conditioning flow path or cartridge that resists the introduction of a volume of fluid after air has been removed from a defined space such as a vessel, conduit, container, flow path, conditioning flow path or cartridge. In one embodiment, and as discussed herein and shown in the drawings is that the controlled compliant system can move fluids bi-directionally. In certain cases, the bi-directional fluid movement is across a semi-permeable membrane either inside or outside a dialyzer. The bi-directional fluid flow can also occur across, through, or between vessels, conduits, containers, flow paths, conditioning flow paths or cartridges of the invention in selected modes of operation. The term "moving fluid bi-directionally" as used in connection with a barrier, such as a semipermeable membrane, refers to the ability to move a fluid across the barrier in either direction. "Moving fluid bi-directionally" also can apply to the ability to move fluid in both directions in the flow path or between a flow path and reservoir in a controlled compliant system.

The terms "controlled compliant flow path," "controlled compliant dialysate flow path" and "controlled compliant solution flow path" refer to flow paths operating within a controlled compliant system having the characteristic of controlled compliance, or of being controlled compliant as defined herein.

The term "convective clearance" refers to the movement of solute molecules or ions across a semi-permeable barrier due to force created by solvent molecules moving across the semi-permeable barrier.

The terms "controller," "control unit," "processor," and "microprocessor" refers, in context, to a device which monitors and affects the operational conditions of a given system. The operational conditions are typically referred to as output variables of the system wherein the output variables can be affected by adjusting certain input variables.

The terms "coordinately operates" and "coordinately operating" refer to controlling the function of two or more elements or devices so that the combined functioning of the two or more elements or devices accomplishes a desired result. The term does not exclusively imply that all such elements or devices are simultaneously energized.

The term "deaeration" refers to removing some or all of the air contained in a liquid including both dissolved and non-dissolved air contained in the liquid.

The terms "de-aeration flow path" and "de-aeration flow path" refer to a set of elements that are configured in fluid communication along a fluid flow pathway such that a liquid can be passed through the fluid flow pathway to accomplish removal of some or all of the air or gas contained in the liquid, including removal of air or gas that is dissolved in the liquid.

The terms "degas module" and "degassing module" refer to a component that separates and removes any portion of one or more dissolved or undissolved gas from a liquid. A degas module can include a hydrophobic membrane for allowing ingress or egress of gases through a surface of the module while preventing the passage of liquid through that surface of the module.

The term "deionization resin" refers to any type of resin or material that can exchange one type of ion for another. In one specific case, the term can refer to the removal of ions such as potassium, magnesium, sodium and calcium in exchange for hydrogen and/or hydroxide ions.

The term "detachable" refers to a characteristic of an object or apparatus that permits it to be removed and/or disconnected from another object or apparatus.

The term "dialysate" describes a fluid into or out of which solutes from a fluid to be dialyzed diffuse through a membrane. A dialysate typically contains electrolytes that are close in concentration to the physiological concentration of electrolytes found in blood. A common sodium level for dialysate is ~140 mEq/L. Normal blood sodium levels range from approximately 135 mEq/L to 145 mEq/L. The REDY system typically uses dialysate ranging from 120 mEq/L to 160 mEq/L. In certain embodiment, a "predetermined limit" or "predetermined concentration" of sodium values can be based off the common sodium levels for dialysate and normal blood sodium levels. "Normal" saline at 0/9% by weight and commonly used for priming dialyzers and extracorporeal circuits is 154 mEq/L.

The terms "dialysate flow loop," "dialysate flow path," and "dialysate conduit flow path" refers, in context, to a fluid pathway that conveys a dialysate and is configured to form at least part of a fluid circuit for hemodialysis, hemofiltration, hemodiafiltration or ultrafiltration.

The terms "dialysate regeneration unit" and "dialysate regeneration system" refer to a system for removing certain electrolytes and waste species including urea from a dialysate after contact with a dialyzer. In certain instances, the component contained within the "dialysate regeneration unit" or "dialysate regeneration system" can decrease the concentration or conductivity of at least one ionic species, or release and/or absorb at least one solute from a dialysate.

"Dialysis" is a type of filtration, or a process of selective diffusion through a membrane. Dialysis removes solutes of a specific range of molecular weights via diffusion through a membrane from a fluid to be dialyzed into a dialysate. During dialysis, a fluid to be dialyzed is passed over a filter membrane, while dialysate is passed over the other side of that membrane. Dissolved solutes are transported across the filter membrane by diffusion between the fluids. The dialysate is used to remove solutes from the fluid to be dialyzed. The dialysate can also provide enrichment to the other fluid.

The terms "dialysis membrane," "hemodialysis membrane," "hemofiltration membrane," "hemodiafiltration membrane," "ultrafiltration membrane," and generally "membrane," refer, in context, to a semi-permeable barrier selective to allow diffusion and convection of solutes of a specific range of molecular weights through the barrier that separates blood and dialysate, or blood and filtrate, while allowing diffusive and/or convective transfer between the blood on one side of the membrane and the dialysate or filtrate circuit on the other side of the membrane.

The term "dialyzer" refers to a cartridge or container with two flow paths separated by semi-permeable membranes. One flow path is for blood and one flow path is for dialysate. The membranes can be in the form of hollow fibers, flat sheets, or spiral wound or other conventional forms known to those of skill in the art. Membranes can be selected from the following materials of polysulfone, polyethersulfone, poly(methyl methacrylate), modified cellulose, or other materials known to those skilled in the art.

"Diffusive permeability" is a property of a membrane describing permeation by diffusion. Diffusion is the process of solutes moving from an area of higher concentration to an area of lower concentration.

The terms "diluate flow channel," "feed stream," "diluate stream," and the like, refer, in context, to a fluid line of solution entering an electrodialysis cell or electrodialysis unit wherein the ion concentration in the fluid solution is changed.

The terms "diluent" and "diluate" refer to a fluid having a concentration of a specific species less than a fluid to which the diluent is added.

A "disc electrode" consists of an electrode with an electrode head in the shape of a disc. A "rod electrode" refers to an electrode in the shape of a rod or cylinder, with one end functioning as an electrode head. A "sheet electrode" refers to an electrode with an electrode head in the shape of a sheet. The sheet can be square, rectangular, circular or other solid planar geometries. A "mesh electrode" refers to an electrode with an electrode head consisting of a mesh, where a mesh is the same as that described for a mesh electrode. An "antenna electrode" refers to an electrode with an electrode head in the shape of an antenna, where antenna shape refers to a serpentine structure of conductive wires or strips. A "pin electrode refers" to a rod electrode with a small diameter. Other electrode and electrode head geometries can be considered.

The term "disinfection fluid" refers to a solution for use in cleaning and disinfecting an apparatus for hemodialysis, hemodiafiltration or hemofiltration. The disinfection fluid may act thermally, chemically, and combinations thereof to inhibit growth of or to destroy microorganisms. The "disinfection fluid" may further act to remove, at least in part, a buildup of microorganisms on a surface of a fluid flow path, such buildups of microorganisms may be commonly referred to as a biofilm.

The terms "diverted sample stream" and "diverting a sample stream" refer redirecting part of a fluid from the main flow path to accomplish another purpose, such as to measure a fluid characteristic, remove a portion of the fluid stream in order to take a sample. More than one sample stream may be diverted, such as a "first sample stream, "second sample stream." "third sample stream," "fourth sample stream," and the like.

The term "dry" as applied to a solid or a powder contained in a cartridge means not visibly wet, and may refer interchangeably to anhydrous and also to partially hydrated forms of those materials, for example, monohydrates and dihydrates.

The term "downstream" refers to a direction in which a moving dialysate or other fluid moves within a conduit or flow path.

The term "downstream conductivity" refers to the conductivity of a fluid solution as measured at a location of a fluid flow path in the direction of the normal fluid flow from a reference point.

The term "drain connection" refers to being joined in fluid communication with a conduit or vessel that can accept fluid egress from the system.

The term "dry composition" refers to a compound that does not contain a substantial quantity of water and can include anhydrous forms as well as hydrates for example, monohydrates and dihydrates.

The term "effluent dialysate," as used herein describes the discharge or outflow after the dialysate has been used for dialysis.

The term "electrode" as used herein describes an electrical conductor used to make contact with a nonmetallic part of a circuit, such as electrical conductors used to contact the fluids of the invention (e.g. dialysate) and to measure the conductivity of the fluid.

The term "electrode" as used herein describes an electrical conductor used to make contact with a part of a fluid, a solid or solution. For example, electrical conductors can be used as electrodes to contact any fluid (e.g. dialysate) to measure the conductivity of the fluid or deliver or receive charge to the fluid. A "disc electrode" consists of an electrode with an electrode head in the shape of a disc. A "rod electrode" refers to an electrode in the shape of a rod or cylinder, with one end functioning as an electrode head. A "sheet electrode" refers to an electrode with an electrode head in the shape of a sheet. The sheet can be square, rectangular, circular or other solid planar geometries. A "mesh electrode" refers to an electrode with an electrode head consisting of a mesh, where a mesh is the same as that described for a mesh electrode. An "antenna electrode" refers to an electrode with an electrode head in the shape of an antenna, where antenna shape refers to a serpentine structure of conductive wires or strips. A "pin electrode" refers to a rod electrode with a small diameter. Other electrode and electrode head geometries can be considered.

The term "electrode array" refers to an array of one or more electrodes contained in an insulator substrate. The insulator substrate can be rigid or flexible and acts to isolate the electrodes from each other. A non-limiting example of an "electrode array" is a flex-circuit, which is a flexible circuit board containing electrodes.

The term "electrode head" refers to the portion of an electrode that is in physical contact with a fluid, that conductivity is to be measured from.

The terms "electrode rinse" and "electrode rinse solution" refer to any suitable solution such as sodium sulfate solution that prevents undesirable oxidation and flushes reactants from an electrode surface.

The terms "electrode rinse flow channel," "electrode rinse stream," and the like refer to a fluid line of an electrode rinse or "electrode rinse solution."

The term "electrode rinse reservoir" refers to a vessel or container for holding the electrode rinse or electrode rinse solution. The reservoir may have an inflexible or flexible volume capacity.

The term "electrodialysis" refers to an electrically driven membrane separation process capable of separating, purifying, and concentrating desired ions from aqueous solutions or solvents.

The term "electrodialysis cell" refers to an apparatus having alternating anion- and cation-exchange membranes that can perform electrodialysis using an electrical driving force between an anode and cathode housed at opposite ends of the cell. The cell consists of a diluate compartment fed by a diluate stream and a concentrate compartment fed by a concentrate stream. One or more electrodialysis cells can be multiply arranged to form an "electrodialysis stack."

The term "electrolyte" refers to an ion or ions dissolved in an aqueous medium, including but not limited to sodium, potassium, calcium, magnesium, acetate, bicarbonate, and chloride.

The terms "electrolyte source" and "electrolyte source" refer to a stored substance that provides one or more electrolytes.

The terms "equilibrated," "equilibrate," "to equilibrate," and the like, refer to a state where a concentration of a solute in a first fluid has become approximately equal to the concentration of that solute in the second fluid. However, the term equilibrated as used herein does not imply that the concentration of the solute in the first fluid and the second fluid have become equal. The term can also be used in reference to the process of one or more gases coming into equilibrium where the gases have equal pressures or between a liquid and a gas.

The term "equilibrated to the solute species concentration" refers to more specifically where a concentration of a particular solute species in a first fluid has become approximately equal to the concentration of that solute species in the second fluid. The concentration need not be exact.

The terms "evacuation volume." "priming volume" and "void volume" refer to the internal volume of a component or collection of components comprising a fluid flow path and are the volume of fluid that can be removed from the fluid flow path to empty the fluid flow path if it has been filled with fluid.

The term "extracorporeal." as used herein generally means situated or occurring outside the body.

The term "extracorporeal circuit" refers to a fluid pathway incorporating one or more components such as, but not limited to, conduits, valves, pumps, fluid connection ports or sensing devices configured therein such that the pathway conveys blood from a subject to an apparatus for hemodialysis, hemofiltration, hemodiafiltration or ultrafiltration and back to the subject.

The terms "extracorporeal flow path pump" and "blood pump" refer to a device to move or convey fluid through an extracorporeal circuit. The pump may be of any type suitable for pumping blood, including those known to persons of skill in the art, for example peristaltic pumps, tubing pumps, diaphragm pumps, centrifugal pumps, and shuttle pumps.

The term "feed solution" refers to a dialysate or ultrafiltrate fluid solution introduced into part of the dialysis or ultrafiltrate system. For example a "feed solution" can refer to a dialysate or ultrafiltrate fluid solution introduced to an electrodialysis cell.

The term "filtering media" refers to a material that can allow a fluid to pass through, but which inhibits passage of non-fluid substances that are larger than a predetermined size.

The terms "filtrate regeneration unit" and "filtrate regeneration system" refer to a system for removing certain electrolytes and waste species including urea from a filtrate produced using filtration.

The terms "filtrate regeneration circuit," "filtrate regeneration loop," and the like, refer to a flow path containing fluid resulting from filtration; for the removal of certain electrolytes and waste species including urea.

The term "filtration" refers to a process of separating solutes from a fluid, by passing the fluid through a filter medium across which certain solutes or suspensions cannot pass. Filtration is driven by the pressure difference across the membrane.

The term "first terminal end" of a flow path refers to one end of the flow path and "second terminal end" refers to another end of the flow path. Neither the "first terminal end" nor the "second terminal end" has any limitation on placement on an arterial or venous side.

The term "first terminal valve" refers to a valve substantially located at one end of a first fluid conduit without any requirement that the valve be place on an arterial or venous side. Similarly, the term "second terminal valve" refers to a valve substantially located at one end of a second fluid conduit and so on without any limitation on placement on an arterial or venous side.

The term "flow loop" refers to a grouping of components that may guide the movement of a fluid, convey the fluid, exchange energy with the fluid, modify the composition of the fluid, measure a characteristic of the fluid and/or detect the fluid. A flow loop comprises a route or a collection of routes for a fluid to move within. Within a flow loop there may be more than one route that a volume of fluid can follow to move from one position to another position. A fluid volume may move through a flow loop such that it recirculates, or passes the same position more than once as it moves through a flow loop. A flow loop may operate to cause fluid volume ingress to and fluid volume egress from the flow loop. The term "flow loop" and "flow path" often may be used interchangeably. Further types of flow paths may be further defined; for example, (1) a recirculation flow path, would be a flow path whose function is in whole or part is to recirculate fluid through the defined flow path; (2) a dialyzer recirculation flow path would be a flow path whose function is in whole or part is to recirculate fluid through the defined flow path having a dialyzer' (3) a controlled compliant flow path would be a flow path would be a flow path that is controlled compliant as defined herein. Any of the defined flow paths may be referred to numerically, as a first flow path, second, third flow path, or fourth flow path, and the like flow paths.

The term "flow path" refers to a route or a collection of routes for a fluid to move within. Within a flow path there may be more than one route that a fluid can follow to move from a first position to a second position. A fluid may move through a flow path such that it recirculates, or passes the same position more than once as it moves through a flow path. A flow path may be a single element such as a tube, or a flow path may be a grouping of components of any type that guide the movement of a fluid. The term "flow loop" and "flow path" often may be used interchangeably.

The terms "flow restriction," "flow restriction device" and "flow restrictor" refer to an element or grouping of elements that resist the flow of fluid through the element or grouping of elements such that the fluid pressure within a flow stream that passes through the element or grouping of elements is greater upstream of the element or grouping of elements than downstream of the element or grouping of elements. A flow restrictor may be an active or passive device. Non-limiting examples of passive flow restriction devices are orifices, venturis, a narrowing, or a simple length of tubing with flow cross section that produces the desired pressure drop when the fluid flows through it, such tubing being essentially rigid or compliant. Non-limiting examples of active flow restrictors are pinch valves, gate valves and variable orifice valves.

The term "flow stream" refers to fluid moving along a flow path

The term "fluid balance control pump" refers to where a control pump is used to adjust the concentration or amount of a solute or fluid in the system. For example, a fluid balance control pump is used for selectively metering in or selectively metering out a designated fluid wherein the concentration or amount of a solute or fluid is adjusted.

The term "fluid characteristic" refers to any chemical or biological components that make up or can be found dissolved or suspended in the fluid or gas properties associated with the fluid; or to any physical property of the fluid including, but not limited to temperature, pressure, general or specific conductivities associated with the fluid or related gases.

The term "fluid communication" refers to the ability of fluid to move from one component or compartment to another within a system or the state of being connected, such that fluid can move by pressure differences from one portion that is connected to another portion.

The term "flush reservoir" is used to describe a container that can accept or store fluid that is removed from the system during rinsing or cleaning of fluid pathways of the system, including draining the system after cleaning and/or disinfection has been completed.

"Hemodiafiltration" is a therapy that combines hemofiltration and hemodialysis.

"Hemofiltration" is a therapy in which blood is filtered across a semi-permeable membrane. Water and solutes are removed from the blood via pressure-driven convection across the membrane. The sieving properties of the membrane exclude certain solutes above a certain threshold from crossing the membrane. One common sieving property is "albumin sieving." In most situations it is not desirable to remove albumin during renal replacement therapy, as lower blood serum albumin is associated with increased mortality rates. In hemofiltration, solutes small enough to pass through the membrane in proportion to their plasma concentration are removed. The driving force is a pressure gradient rather than a concentration gradient. A positive hydrostatic pressure drives water and solutes across the filter membrane from the blood compartment to the filtrate compartment, from which it is drained. Solutes, both small and large, get dragged through the membrane at a similar rate by the flow of water that has been engineered by the hydrostatic pressure. Hence, convection overcomes the reduced removal rate of larger solutes (due to their slow speed of diffusion) observed in hemodialysis. The rate of solute removal is proportional to the amount of fluid removed from the blood circuit, which can be adjusted to meet the needs of a clinical situation. In general, the removal of large amounts of plasma water from the patient requires volume substitution. Substitution fluid, typically a buffered solution close to the plasma water composition a patient needs, can be administered pre or post filter (pre-dilution mode, post-dilution mode).

"Hemodialysis" is a technique where blood and a "cleansing fluid" called dialysate are exposed to each other separated by a semi-permeable membrane. Solutes within the permeability range of the membrane pass while diffusing along existing concentration gradients. Water and solutes are also transferred by convection across a pressure gradient that may exist across the dialysis membrane. The dialysate employed during hemodialysis has soluble ions such as sodium, calcium and potassium ions and is not pure water. The sieving properties of the membrane exclude certain solutes above a certain threshold from crossing the membrane. One common sieving property is "albumin sieving." In most situations it is not desirable to remove albumin during renal replacement therapy, as lower blood serum albumin is associated with increased mortality rates.

The term "hemofilter" refers to a apparatus (or may refer to a filter) used in hemofiltration. A hemofilter apparatus can be connected to an extracorporeal circuit and configured to operate with a semipermeable membrane that separates at least a portion of the fluid volume from blood to produce a filtrate fluid.

The term "hydrophobic membrane" refers to a semipermeable porous material that may allow gas phases of matter to pass through, but which substantially resists the flow of water through the material due to the surface interaction between the water and the hydrophobic material.

"Hemodiafiltration" is a therapy that combines hemofiltration and hemodialysis.

The term "in contact" as referred to herein denotes (a) a coming together or touching, as of objects or surfaces; or (b) the state or condition of touching or of being in immediate proximity. "In contact" also includes fluids that are "in fluid communication with" with a solid, such as for example, a fluid, like a dialysate, in contact with a material layer of a sorbent cartridge, or a fluid in contact with a sensor.

The terms "infusate container" and "infusate reservoir" refer to a vessel, which can be substantially inflexible or non-flexible for holding a solution of one or more salts for the adjustment of the composition of a dialysate.

The term "infusate solution" refers to a solution of one or more salts for the adjustment of the composition of a dialysate, such as salts of calcium, magnesium, potassium, and glucose.

The term "infusate system" refers to a system that incorporates at least one fluid pathway including components such as conduits, valves, pumps or fluid connection ports, an infusate container or a controller configured to add an infusate solution to the dialysate.

The term "interchangeable bicarbonate cartridge" refers to a bicarbonate cartridge that can be configured for removal and replacement with a like bicarbonate cartridge. Interchangeable bicarbonate cartridges can be single use disposable, or re-fillable, re-usable containers.

The term "interchangeable sodium chloride cartridge" refers to a sodium chloride cartridge that can be configured for removal and replacement with a like sodium chloride cartridge. Interchangeable sodium chloride cartridges can be single use disposable, or re-fillable, re-usable containers.

The terms "introduce" and "introducing" refer to causing a substance to become present where it was not present, or to cause the amount or concentration of a substance to be increased.

The term "ion-exchange material" refers to any type of resin or material that can exchange one type of ion for another. The "ion-exchange material" can include anion and cation exchange materials. In one specific case, the term can refer to the removal of ions such as potassium, magnesium, sodium, phosphate and calcium in exchange for other ions such as potassium, sodium, acetate, hydrogen and/or hydroxide.

An "ion-exchange resin" or "ion-exchange polymer" is an insoluble matrix (or support structure) that can be in the form of small (1-2 mm diameter) beads, fabricated from an organic polymer substrate. The material has a developed structure of pores on the surface of which are sites with easily trapped and released ions. The trapping of ions takes place only with simultaneous releasing of other ions; thus the process is called ion-exchange. There are multiple different types of ion-exchange resin which are fabricated to selectively prefer one or several different types of ions. In one specific case, the term can refer to the removal of ions such as potassium, magnesium, sodium, phosphate and calcium in exchange for other ions such as potassium, sodium, acetate, hydrogen and/or hydroxide.

The term "ion selective electrode" (ISE), also known as a specific ion electrode (SIE), is a transducer (or sensor) that converts the activity of a specific ion dissolved in a solution into an electrical potential, which can be measured by a voltmeter or pH meter. The voltage is theoretically dependent on the logarithm of the ionic activity, according to the Nernst equation. The sensing part of the electrode is usually made as an ion-specific membrane, along with a reference electrode.

The term "junction" refers to a common point of connection between two or more flow paths or conduits that allows a liquid and/or a gas to move from one pathway or conduit to another. A junction may be a reversible connection that can be separated when transfer of a liquid and/or gas between the flow paths or conduits is not needed.

The term "kidney replacement therapy" as used herein describes the use of a provided system to replace, supplement, or augment the function of a patient with impaired kidney function, such as would occur for a patient with Chronic Kidney Disease. Examples of kidney replacement therapy would include dialysis, hemofiltration, hemodialysis, hemodiafiltration, peritoneal dialysis, and the like.

The terms "luer connector" and "luer adapter" refer to adapters or connectors conforming to International Standards Organization (ISO) standards 594-2.

The term "manifold" refers to a collection of one or more fluid pathways that are formed within a single unit or subassembly. Many types of manifolds can be used, e.g. a cleaning and/or disinfecting manifold is used to clean or disinfect the defined flow loop when the flow loop is connected to the cleaning and/or disinfecting manifold.

The term "material layer" refers to the layers of materials found in a sorbent cartridge. The material layers in a sorbent cartridge may have one or more layers selected from a urease-containing material, alumina, zirconium phosphate, zirconium oxide, and activated carbon.

The term "memory" refers to a device for recording digital information that can be accessed by a microprocessor, such as RAM, Dynamic RAM, microprocessor cache, FLASH memory, or memory card.

The term "mesh electrode" refers to an electrode in the shape of a mesh, where a mesh consists of a planar structure with openings. The mesh can be made from; overlapping wires or strips, a sheet machined or manufactured to contain holes or openings, or a sheet with a permeable, porous structure. In all cases the mesh is manufactured from materials that result in electrodes, such as titanium, platinum, stainless steel, and iridium. In the case of an electrode mesh consisting of overlapping wires or strips, certain wires or strips can be isolated from other wires or strips with an insulator material in order to apply one polarity to certain wires or strips and the opposite polarity to other wires or strips.

The term "metabolic waste species," as used herein describes organic and inorganic components generated by a patient. They can be metabolic products such as urea, uric acid, creatinine, chlorides, inorganic sulfates and phosphate, or excess electrolytes such as sodium, potassium, etc. It will be understood that the specific "metabolic waste species" can vary between individuals depending on diet and environmental factors. Hence, the term is intended to encompass any waste component that is normally removed by a kidney or by dialysis without restriction on the specific type of waste substance.

The term "mid-weight uremic wastes" refers to uremic wastes that can pass through a dialysis membrane and have a molecular weight less than about 66,000 g/mol and greater than about 1000 g/mol. An example of a middle molecule is beta-2 microglobulin.

The term "mixing chamber" refers to a chamber or vessel, with one or more inlet and outlet fluid streams, that provides mixing between the fluid streams entering the chamber.

The term "moving fluid bi-directionally" as used in connection with a barrier, such as a semi-permeable membrane, refers to the ability to move a fluid across the barrier in either direction. "Moving fluid bi-directionally" also can apply to the ability to move fluid in both directions in the flow loop in a controlled compliant system.

A multiplexer" or "mux" is an electronic device that selects one of several analog or digital input signals and forwards the selected input into a single line.

The term "nitrogenous waste" refers to any non-polymeric nitrogen-containing organic compound originating from the blood of a patient. Nitrogenous waste includes urea and creatinine, which are both "waste species."

The term "one-way valve" refers to a device that allows flow to pass in one direction through the valve, but prevents or substantially resists flow through the valve in the opposite direction. Such devices can include devices commonly referred to as check valves "Osmolarity" is defined as the number of osmoles of a solute per liter of solution. Thus, a "hyperosmolar solution" represents a solution with an increase in osmolarity compared to physiologic solutions. Certain compounds, such as mannitol, may have an effect on the osmotic properties of a solution as described herein.

The term "parallel or wound hollow fiber assembly" refers to any device that incorporates a porous or non-porous hollow fiber material that allows a gas to pass through the material wall of the hollow fibers, but resists the passage of a liquid through the material wall and is configured as multiple strands aligned in parallel or wrapped around a core. The liquid to be degassed may be conveyed through either the inside of the hollow fibers or around the outside of the hollow fibers. Optionally, a gas may be conveyed on the side of the material wall that is opposite the liquid to be degassed. Optionally, a vacuum may be applied on the side of the material wall that is opposite the liquid to be degassed.

A "patient" or "subject" is a member of any animal species, preferably a mammalian species, optionally a human. The subject can be an apparently healthy individual, an individual suffering from a disease, or an individual being treated for a disease.

The term "parallel to a central axis" refers to the position of components, e.g. sensors that can be placed in a plane having portions generally parallel to the central axis.

The terms "pathway," "conveyance pathway" and "flow path" refer to the route through which a fluid, such as dialysate or blood travels.

The term "patient fluid balance" refers to the amount or volume of fluid added to or removed from a subject undergoing a treatment.

The term "peristaltic pump" refers to a pump that operates by compression of a flexible conduit or tube through which the fluid to be pumped passes.

The term "perpendicular to a central axis" refers to the position of components, e.g. sensors that can be placed in a plane having portions generally perpendicular to the central axis.

"Peritoneal dialysis" is a therapy wherein a dialysate is infused into the peritoneal cavity, which serves as a natural dialyzer. In general, waste components diffuse from a patient's bloodstream across a peritoneal membrane into the dialysis solution via a concentration gradient. In general, excess fluid in the form of plasma water flows from a patient's bloodstream across a peritoneal membrane into the dialysis solution via an osmotic gradient.

The term "pH-buffer modifying solution" refers to a solution that can reduce the acidity (pH) of the working dialysate solution when added to the dialysate The term "pH-buffer sensor" refers to a device for measuring the acidity or basicity (pH) and the buffer concentration of the dialysate solution.

The term "pH-buffer management system" refers to a system managing the pH and buffer concentration of a dialysate by adding, removing or generating a fluid to the dialysate such that the dialysate is modified by the pH-buffer management system to have a different pH and buffer concentration.

The term "pH-buffer measurement system" refers to a system measuring the pH and/or buffer concentration of a dialysate or fluid within the system.

The terms "portable system" and "wearable system" refers to a system in whole or in part having a mass and dimension to allow for transport by a single individual by carrying the system or wearing the system on the individual's body. The terms are to be interpreted broadly without any limitation as to size, weight, length of time carried, comfort, ease of use, and specific use by any person whether man, woman or child. The term is to be used in a general sense wherein one of ordinary skill will understand that portability as contemplated by the invention encompasses a wide range of weights, geometries, configurations and size.

The term "potable water" refers to drinking water or water that is generally safe for human consumption with low risk of immediate or long term harm. The level of safety for human consumption can depend on a particular geography where water safe for human consumption may be different from water considered safe in another jurisdiction. The term does not necessarily include water that is completely free of impurities, contaminants, pathogens or toxins. Other types of water suitable for use in the present invention can include purified, deionized, distilled, bottled drinking water, or other pre-processed water that would be understood by those of ordinary skill in the art as being suitable for use in dialysis.

The term "potassium-modified fluid" refers to fluid having a different conductivity or potassium concentration compared to a second fluid to which the potassium-modified fluid is added to modify the conductivity or potassium concentration of the second fluid.

The terms "physiologically compatible fluid" and "physiological compatible solution" refer to a fluid that can be safely introduced into the bloodstream of a living subject.

The term "plumbing," as used herein generally describes any system of valves, conduits, channels, and lines for supplying any of the fluids used in the invention.

The term "porosity." as used herein describes the fraction of open pore volume of a membrane.

The terms "pressure differential" and "pressure drop" refer to the difference in pressure measurements of a fluid between two points of measurement.

The terms "pressure meter" and "pressure sensor" refer to a device for measuring the pressure of a gas or liquid in a vessel or container.

The terms "priming process" and "priming" refer to the process of conveying a liquid into the void volume of a fluid pathway to fill the pathway with liquid.

The term "priming volume" refers to the volume of priming fluid required to fill the void volume of the subject pathway, device, or component, as the particular case may be.

The term "priming overflow reservoir" refers to a reservoir which during priming is used to collect the overflow of fluid during the priming process.

The terms "processor," "computer processor." and "microprocessor" as used herein are broad terms and are to be given their ordinary and customary meaning to a person of ordinary skill in the art. The terms refer without limitation to a computer system, state machine, processor, or the like designed to perform arithmetic or logic operations using logic circuitry that responds to and processes the basic instructions that drive a computer. In some embodiments, the terms can include ROM ("read-only memory") and/or RAM ("random-access memory") associated therewith.

The term "programmable" as used herein refers to a device using computer hardware architecture with a stored program and being capable of carrying out a set of commands, automatically that can be changed or replaced.

The term "pump" refers to any device that causes the movement of fluids or gases by the application of suction or pressure.

The term "pulsatile pump" refers to a pump where the pumped fluid undergoes periodic variation in velocity and/or pressure.

The terms "reconstitute" and "reconstituting" refer to creating a solution by addition of a liquid to a dry material or to a solution of higher concentration to change the concentration level of the solution. A "reconstitution system" in one use, is a system that rebalances the dialysate in the system to ensure it contains the appropriate amount of electrolytes and buffer.

The terms "sorbent regeneration," "sorbent regeneration system," "sorbent system, and the like, refer, in context, to devices that are part of a sorbent regenerated dialysate delivery system for hemodialysis, functioning as an artificial kidney system for the treatment of patients with renal failure or toxemic conditions, and that consists of a sorbent cartridge and the means to circulate dialysate through this cartridge and the dialysate compartment of the dialyzer. The device is used with the extracorporeal blood system and the dialyzer of the hemodialysis system and accessories. The device may include the means to maintain the temperature, conductivity, electrolyte balance, flow rate and pressure of the dialysate, and alarms to indicate abnormal dialysate conditions. The sorbent cartridge may include absorbent, ion exchange and catalytics.

The term "shunt," as most often used herein describes a passage between channels, in the described filtration and purification systems, wherein the shunt diverts or permits flow from one pathway or region to another. An alternate meaning of "shunt" can refer to a pathway or passage by which a bodily fluid (such as blood) is diverted from one channel, circulatory path, or part to another. The term "bypass" can often be used interchangeably with the term "shunt."

The term "sodium-concentrate solution" refers to a solution having a high concentration of sodium ions relative to another solution or fluid.

The terms "sodium chloride cartridge" and "sodium chloride container" refer to an object that can be a stand-alone enclosure or alternatively can be integrally formed with an apparatus for hemodialysis, hemodiafiltration, or hemofiltration. The object can store a source of sodium, such as sodium chloride in solid and/or solution form, and can be configured to interface with at least one other functional module found in systems for hemodialysis, hemodiafiltration, or hemofiltration. For example, the sodium chloride cartridge or container can contain at least one fluid pathway and include components such as conduits, valves, filters or fluid connection ports.

The term "regenerative capacity of the sorbent" refers to the remaining capacity for the sorbent cartridge or a particular material layer of the sorbent cartridge to perform its intended function.

The term "regenerative substance" refers to a sorbent material contained in a "regeneration module." The term "first chosen regenerative substance," as used in the present invention refers to a particular regenerative substance, identified as "first chosen regenerative substance." The term "second chosen regenerative substance" refers to a particular regenerative substance, identified as "second chosen regenerative substance."

The term "regeneration module" refers to an enclosure having one or more sorbent materials for removing specific solutes from solution, such as urea. In certain embodiments, the term "regeneration module" includes configurations where at least some of the materials contained in the module do not act by mechanisms of adsorption or absorption.

The terms "remnant volume" and "residual volume" refer to the volume of fluid remaining in a fluid flow path after the fluid flow path has been partially emptied or evacuated.

The terms "replacement fluid" and "substitution fluid" refer to fluid that is delivered to the blood of a subject undergoing convective renal replacement therapies such as hemofiltration or hemodiafiltration in order to replace at least a portion of the fluid volume that is removed from the subject's blood when the blood is passed through a hemofilter or a dialyzer.

The term "reserve for bolus infusion" refers to an amount of solution available, if needed, for the purpose of administering fluid to a subject receiving therapy, for example, to treat an episode of intradialytic hypotension.

The term "reusable" refers to an item that is used more than once. Reusable does not imply infinitely durable. A reusable item may be replaced or discarded after one or more use.

The term "reverse osmosis" refers to a filtration method of forcing a solvent from a region of high solute concentration through a semipermeable membrane to a region of low solute concentration by applying a pressure in excess of osmotic pressure. To be "selective," this membrane should not allow large molecules or ions through the pores (holes), but should allow smaller components of the solution (such as the solvent) to pass freely.

The term "reverse osmosis rejection fraction" refers to the resulting solute that is retained on the pressurized side of the membrane and the pure solvent is allowed to pass to the other side in a reverse osmosis system.

The term "reversible connections" refers to any type of detachable, permanent or non-permanent connection configured for multiple uses.

The term "salination pump" refers to a pump configured to move fluid and/or control movement of fluid through a conditioning flow path, such as through or from a source of a conditioning material such as sodium chloride or sodium bicarbonate.

The term "salination valve" refers to a valve configured to control the flow of fluid in a conditioning flow path, such as through or from a source of a conditioning material such as sodium chloride or sodium bicarbonate.

The term "segment" refers to a portion of the whole, such as a portion of a fluid flow path or a portion of a fluid circuit. A segment is not limited to a tube or conduit, and includes any grouping of elements that are described for a particular segment. Use of the term "segment." by itself, does not imply reversible or detachable connection to another segment. In any embodiment, a segment may be permanently connected to one or more other segments or removably or detachably connected to one or more segments.

The terms "selectively meter fluid in" and "selectively meter fluid out" generally refer to a process for controllably transferring fluids from one fluid compartment (e.g. a selected patient fluid volume, flow path, or reservoir) to another fluid compartment. One non-limiting example is where a control pump may transfer a defined fluid volume container, reservoirs, flow paths, conduit of the controlled compliant system. When fluid is moved from a reservoir into another part of the system, the process is referred to as "selectively metering fluid in" as related to that part of the system. Similarly, one non-limiting example of removing a defined volume of dialysate from a dialysate flow path in a controlled compliant system and storing the spent dialysate in a control reservoir, can be referred to as "selectively metering-out" the fluid from the dialysate flow path.

The terms "semipermeable membrane," "selectively permeable membrane," "partially permeable membrane." and "differentially permeable membrane," refer to a membrane that will allow certain molecules or ions to pass through it by diffusion and occasionally specialized "facilitated diffusion". The rate of passage depends on the pressure, concentration, and temperature of the molecules or solutes on either side, as well as the permeability of the membrane to each solute. The term "semi-permeable membrane" can also refer to a material that inhibits the passage of larger molecular weight components of a solution while allowing passage of other components of a solution having a smaller molecular weight. For example, Dialyzer membranes come with different pore sizes. Those with smaller pore size are called "low-flux" and those with larger pore sizes are called "high-flux." Some larger molecules, such as beta-2-microglobulin, are not effectively removed with low-flux dialyzers. Because beta-2-microglobulin is a large molecule, with a molecular weight of about 11,600 daltons, it does not pass effectively through low-flux dialysis membranes.

The term "sensor," which can also be referred to as a "detector" in certain instances, as used herein can be a converter that measures a physical quantity of a matter in a solution, liquid or gas, and can convert it into a signal which can be read by an electronic instrument.

The term "sensor element" refers to a device or component of a system that detects or measures a physical property.

The terms "sodium management system" and "sodium management" broadly refer to a system or process that can maintain the sodium ion concentration of a fluid in a desired range. In certain instances, the desired range can be within a physiologically-compatible range. The sodium ion concentration of an input solution can be modified by any means including application of an electrical field.

The term "sodium-modified fluid" refers to fluid having a different conductivity or sodium concentration compared to a second fluid to which the sodium-modified fluid is added to modify the conductivity or sodium concentration of the second fluid.

The term "sodium conduit flow path" refers to a flow path in fluid communication with a sodium chloride cartridge which then can pump saturated sodium solution into the dialysate by pumping and metering action of a salination pump.

The term "sodium source" refers to a source from which sodium can be obtained. For example, the sodium source can be a solution containing sodium chloride or a dry sodium chloride composition that is hydrated by the system.

The term "solid potassium" refers to a solid composition containing a salt of potassium such as potassium chloride at any purity level. In general, the solid potassium will be easily soluble in water to form a solution.

The term "solid sodium" refers to a solid composition containing a salt of sodium such as sodium chloride at any purity level. In general, the solid potassium will be easily soluble in water to form a solution and of high purity.

The term "solid bicarbonate" refers to a composition containing a salt of bicarbonate such as sodium bicarbonate at any purity level. In general, the solid bicarbonate will be easily soluble in water to form a solution.

The term "solute" refers to a substance dissolved, suspended, or present in another substance, usually the component of a solution present in the lesser amount.

The terms "sorbent cartridge" and "sorbent container" refer to a cartridge containing one or more sorbent materials for removing specific solutes from solution, such as urea. "Sorbent cartridge" includes configurations where at least some of the materials contained in the cartridge do not act by mechanisms of adsorption or absorption.

The terms "sorbent regeneration," "sorbent regeneration system," "sorbent system, and the like, refer, in context, to devices that are part of a sorbent regenerated dialysate delivery system for hemodialysis, functioning as an artificial kidney system for the treatment of patients with renal failure or toxemic conditions, and that consists of a sorbent cartridge and the means to circulate dialysate through this cartridge and the dialysate compartment of the dialyzer. The device is used with the extracorporeal blood system and the dialyzer of the hemodialysis system and accessories. The device may include the means to maintain the temperature, conductivity, electrolyte balance, flow rate and pressure of the dialysate, and alarms to indicate abnormal dialysate conditions. The sorbent cartridge may include absorbent, ion exchange and catalytics.

The term "source of cations" refers a source from which cations can be obtained. Examples of cations include, but are not limited to, calcium, magnesium and potassium. The source can be a solution containing cations or a dry composition that is hydrated by the system. The cation infusate source is not limited to cations and may optionally include other substances to be infused into a dialysate or replacement fluid. Non-limiting examples include glucose, dextrose, acetic acid and citric acid.

The term "specified gas membrane permeability" refers to a determined rate at which a gas membrane will allow a gas to pass through the membrane from a first surface to a second surface, the rate being proportional to the difference in absolute pressure of the gas in proximity to the first side of the membrane and in proximity to the second side of the membrane.

The term "spent dialysate" refers to a dialysate that has been contacted with blood through a dialysis membrane and contains one or more impurity, or waste species, or waste substance, such as urea.

The term "static mixer" refers to a device that mixes two or more component materials in a fluid solution without requiring the use of moving parts.

The term "substantially inflexible volume" refers to a three-dimensional space within a vessel or container that can accommodate a maximum amount of non-compressible fluid and resists the addition of any volume of fluid above the maximum amount. The presence of a volume of fluid less than the maximum amount will fail to completely fill the vessel or container. Once a substantially inflexible volume has been filled with a fluid, removal of fluid from that volume will create a negative pressure that resists fluid removal unless fluid is added and removed simultaneously at substantially equal rates. Those skilled in the art will recognize that a minimal amount of expansion or contraction of the vessel or container can occur in a substantially inflexible volume; however, the addition or subtraction of a significant volume of fluid over a maximum or minimum will be resisted.

The term "tap water" refers to water, as defined herein, from a piped supply.

The term "temperature sensor" refers to a device that detects or measures the degree or intensity of heat present in a substance, object, or fluid.

A "therapy solution reservoir" refers to any container or reservoir that holds a physiological compatible fluid.

The term "total bicarbonate buffer concentration" refers to the total concentration of bicarbonate ($HCO3-$) ion and a conjugate acid of bicarbonate in a solution or composition.

A "therapy solution reservoir" refers to any container or reservoir that holds a physiological compatible fluid.

The terms "treating" and "treatment" refer to the management and care of a patient having a pathology or condition by administration of one or more therapy contemplated by the present invention. Treating also includes administering one or more methods of the present invention or using any of the systems, devices or compositions of the present invention in the treatment of a patient. As used herein, "treatment" or "therapy" refers to both therapeutic treatment and prophylactic or preventative measures. "Treating" or "treatment" does not require complete alleviation of signs or symptoms, does not require a cure, and includes protocols having only a marginal or incomplete effect on a patient.

The term "uremic wastes" refers to a milieu of substances found in patients with end-stage renal disease, including urea, creatinine, beta-2-microglobulin.

The term "ultrafiltrate" refers to fluid that is removed from a subject by convection through a permeable membrane during hemodialysis, hemofiltration, hemodiafiltration, or peritoneal dialysis. The term "ultrafiltrate," as used herein, can also refer to the fluid in a reservoir that collects fluid volume removed from the patient, but such a reservoir may also include fluids or collections of fluids that do not originate from the subject.

The term "ultrafiltration" refers to subjecting a fluid to filtration, where the filtered material is very small; typically, the fluid comprises colloidal, dissolved solutes or very fine solid materials, and the filter is a microporous, nanoporous, or semi-permeable medium. A typical medium is a membrane. During ultrafiltration, a "filtrate" or "ultrafiltrate" that passes through the filter medium is separated from a feed fluid. In general, when transport across a membrane is predominantly diffusive as a result of a concentration driving force, the process is described herein as dialysis. When transport is primarily convective as a result of bulk flow across the membrane induced by a pressure driving force, the process is ultrafiltration or hemofiltration depending on the need for substitution solution as the membrane passes small solutes but rejects macromolecules. The term "ultrafiltration" can also refer to the fluid removal from blood during a dialysis or a hemofiltration process. That is, ultrafiltration refers to the process of passing fluid through a selective membrane, such as a dialysis or hemofiltration membrane, in either a dialysis, a hemodiafiltration, or a filtration process.

The terms "unbuffered sodium bicarbonate" or "solution of unbuffered sodium bicarbonate" refer to a sodium bicarbonate composition that is not buffered with a conjugate acid or base in any amount, proportion or pH adjustment.

The term "upstream" refers to a direction opposite to the direction of travel of a moving dialysate or other fluid within a conduit or flow path.

The term "urea sensor" refers to a device for measuring or allowing for the calculation of urea content of a solution. The "urea sensor" can include devices measuring urease breakdown of urea and measurement of the resulting ammonium concentration. The sensing methods can be based on any one of conductimetric, potentiometric, thermometric, magnetoinductic, optical methods, combinations thereof and other methods known to those of skill in the art.

The term "vacuum" refers to an action that results from application of a pressure that is less than atmospheric pressure, or negative to the reference fluid or gas.

The term "vent" as referred to in relationship to a gas, refers to permitting the escape of a gas from an defined portion of the system, such as, for example, as would be found in the degassing module.

The term "void volume" refers to a specific volume that can be occupied by a fluid in a defined space such as a dialysate circuit of the invention including all components contained therein.

The terms "waste species," "waste products" and "impurity species" refers to any molecular or ionic species originating from the patient or subject, including metabolic wastes, molecular or ionic species including nitrogen or sulfur atoms, mid-weight uremic wastes and nitrogenous waste. Waste species are kept within a specific homeostasis range by individuals with a healthy renal system.

The term "waste fluid" refers to any fluid that does not have a present use in the operation of the system. Non-limiting examples of waste fluids include ultrafiltrate, or fluid volume that has been removed from a subject undergoing a treatment, and fluids that are drained or flushed from a reservoir, conduit or component of the system.

The term "working dialysate solution" refers to a dialysate solution that is undergoing active circulation or movement through a system including conduits, pathways, dialyzers and cartridges.

Dialysis System

FIG. 1 is an example of a dialysis system consisting of a blood path and a dialysate regeneration path separated by membranes contained in a dialyzer 20. The blood enters the dialyzer 20 through a flow line inlet 22 and exits through a flow line outlet 24. The dialysate regeneration circuit shown in FIG. 1 consists of a substantially inflexible volume flow loop 46. The dialysate solution is recirculated with a dialysate pump 30 and allowed to flow through a dialysate regeneration unit 32.

The dialysate regeneration unit 32 consists of components or materials that are capable of removing solutes from the dialysate including: urea, phosphate, calcium, magnesium, potassium, creatinine, uric acid, beta-2-microglobulin and sulfate. The dialysate regeneration unit 32 may also contain components or materials that release or bind sodium during the process of removing solutes from the dialysate. For example, the dialysate regeneration unit 32 may consist of a sorbent cartridge containing activated carbon, urease, zirconium phosphate and hydrous zirconium oxide, similar to the sorbent cartridge used in the "REDY" system. The dialysate regeneration unit is further capable of removing a waste species from the dialysate and releasing a bicarbonate buffer component, unbuffered sodium bicarbonate, carbon dioxide or combinations thereof to the dialysate.

Blood circulating through the dialyzer 20 via an extracorporeal circuit exchanges waste components with dialysate circulating through the dialyzer 20 and dialysate flow loop 46. Waste species including ions and uremic toxins, such as uric acid, creatinine, and β2-microglobin, and urea diffuse from the blood to the dialysate within the dialyzer 20 via a semipermeable membrane contained therein.

Regeneration of the dialysate within the dialysate flow loop 46 can be achieved through contacting the dialysate with sorbents contained within the dialysate regeneration unit 32. Examples of useful sorbent materials include the REDY sorbent system and U.S. Pat. Nos. 3,669,880; 3,989, 622; 4,581,141; 4,460,555; 4,650,587; 3,850,835; 6,627, 164; 6,818,196; and 7,566,432 and U.S. Patent Publications 2010/007838; 2010/0084330; and 2010/0078381 and International Patent Publication WO 2009/157877 A1, which are incorporated herein by reference. In some embodiments, the dialysate regeneration unit 32 can contain one or more different kinds of materials. Such materials can be one or more selected from the following group: 1) a urease-containing material, where urease is an enzyme that catalyzes the conversion of urea to ammonium ions and carbon dioxide; 2) a zirconium phosphate (ZrP) material that has the capacity to act as a cation exchanger by absorbing a large quantity of ammonium ions in exchange for sodium and hydrogen ions; 3) a zirconium oxide material (ZrO), namely hydrous zirconium oxide, which acts as an anion exchanger by exchanging phosphate for acetate; and 4) an activated carbon material that has a surface area for adsorption of wide range of impurities including metal ions and uremic toxins, such as uric acid, creatinine, and β2-microglobin. In some embodiments, the zirconium phosphate material can be replaced with a magnesium phosphate material.

The principal waste species removed during treatment of a patient is urea that accumulates in the blood of individuals with various degrees of kidney disease or impairment. Since urea is an electrically neutral species, the dialysate regeneration unit 32 can convert urea to a charged ammonium species that can then be removed from the dialysate before the dialysate exits the regeneration unit 32. In certain embodiments, the ammonium may be removed by an ion exchange material prior to exiting the dialysate regeneration unit 32. However, in order to maintain electrical neutrality, the removal of charged ammonium species is matched by exchange with another charged species, which is sodium ion and/or hydrogen ion in certain embodiments. Further, carbonate ion and/or CO2 is also a product of urease activity. Dialysate typically include a bicarbonate buffer; however, the generation of hydrogen ions and carbonate ions by the dialysate regeneration unit 32 can affect the pH and total bicarbonate buffer composition of the dialysate.

In one embodiment, a urea sensor 41 measures the urea concentration of the dialysate flowing to the dialysate regeneration unit 32. However, it will be understood that the urea sensor can be placed on any part of the dialysate loop and in one or more locations using multiple sensors. The urea sensor can also be integrally formed with one or more components of the system including the dialysate regeneration unit 32. In certain aspects, one or more urea sensors can function integrally with the sorbent cartridge contained within the dialysate regeneration unit 32. A flow sensor may be used, or a pump 30 that provides a known flow rate, to determine, in combination with the urea sensor 41, the amount of urea entering the dialysate regeneration unit 32. In certain embodiments, the urea entering the dialysate regeneration unit 32 will break down into ammonium carbonate. A portion of the carbonate ions will convert to carbon dioxide or bicarbonate depending on characteristics of the dialysate regeneration unit 32. In certain embodiments the ammonium carbonate will pass through a cation-exchange resin, such as zirconium phosphate, which will remove ammonium in exchange for hydrogen ions and sodium ions. The amount of hydrogen and sodium ions released will influence the dialysate solution pH and ultimately the concentration of carbon dioxide and bicarbonate in solution. It is possible to characterize the system sufficiently to predict the resulting concentration of carbon dioxide and bicarbonate that result for a given dialysate concentration of urea entering the dialysate regeneration unit 32. Knowing the concentration of bicarbonate resulting from urea allows adjustment of the total buffer concentration in order to achieve a specific therapeutic goal related to a patient's acid-base balance. Methods to adjust the total buffer concentration are described below.

Methods for measuring the urea concentration of the dialysate with the urea sensor 41 include commercially available sensors based on urease breakdown of urea and measurement of the resulting ammonium concentration. Another method takes advantage of certain embodiments of the dialysate regeneration unit 32. In one embodiment, the dialysate regeneration unit 32 consists of multiple sorbent layers, one of which is a urease layer. By measuring the conductivity change of the dialysate solution before and after the urease layer the concentration of urea in the dialysate can be determined. As such, the term "urea sensor" refers to a combination of elements and sensors that are individually or collectively used to directly or indirectly indicate urea concentration. Indirect indication of urea concentration can be determined by measuring changes in conductivity, pH, CO2, or ammonia concentration effected by urease breakdown of urea. The urea sensor can be collocated with another system element, such as dialysate regeneration unit 32. Other methods known to those skilled in the art to measure urea in an aqueous solution may also be applied.

After passing through the dialysate regeneration unit 32, the dialysate flows through a degasser 39. The degasser 39 acts to remove gasses dissolved in solution and non-dissolved gasses from the dialysate fluid, such as carbon dioxide, oxygen and nitrogen. The degasser 39 can contain a chamber containing a hydrophobic membrane allowing release of gas, also known as a membrane contacting degasser. The hydrophobic membrane can contain polytetrafluoroethylene (PTFE), polypropylene, or other suitable materials that allow for gas removal, but retard water intrusion. The degasser 39 may function passively or actively. Passive degassing involves passing the dialysate through a degassing chamber containing a hydrophobic membrane and allowing gas to escape based on the uncontrolled environmental conditions on the non-dialysate side of the membrane. Active degassing involves passing the dialysate through a degassing chamber containing a hydrophobic membrane and actively controlling the environmental conditions on the non-dialysate side of the membrane. For example, the non-dialysate side of the membrane can be placed under reduced pressure to drive gas removal from the dialysate. The reduced pressure could be controlled to influence the rate of gas removal. Active degassing could also involve passing a stripping gas along the non-dialysate side of the hydrophobic membrane. The stripping gas can be the atmosphere contained on the exterior of the dialysis system, or be supplied from a gas cylinder of nitrogen, argon, helium, or other suitable gas. The flow rate of the stripping gas can be controlled to influence the rate of gas removal. The rate of gas removal could also be monitored with a flow meter in order to perform closed-loop control of the active degasser. The degasser 39 can also include a chamber that promotes gas nucleation and subsequent removal from the dialysate. For example, the degassing chamber can have modified surfaces to increase surface area and thereby promote gas removal. The degassing chamber can also contain materials that have high-surface area, such as boiling stones or surface modified particles. Gas nucleation promoters can be used with both active and passive degassing methods. An example of commercially available boiling stones is PTFE boiling stones sold by Sigma-Aldrich (St. Louis, Mo.). An example of a commercially available membrane contacting degasser is the Liqui-Cell Minimodule™ sold by Membrana (Charlotte, N.C.).

After passing through the degasser 39 the dialysate flow passes a conductivity sensor 40 and an optional pH-buffer sensor 45. In certain embodiments, a urea sensor is not required when a pH-buffer sensor is used; however, the urea sensor can be used in conjunction with the pH-buffer sensor for more accurate measurements. The conductivity sensor 40 measures the conductivity of the dialysate solution, which is a measure of the total sodium concentration because sodium is the major conductive species in the dialysate before and after the dialysate regeneration unit 32. The conductivity sensor 40 can be used for safety purposes to determine if the sodium concentration of the dialysate is at an acceptable level for the patient. The pH-buffer sensor measures the pH and buffer concentration of the dialysate solution. The pH sensor may include various sensors known to those skilled in the art, such as a standard pH electrode based sensor. Preferably the buffer sensor is capable of measuring bicarbonate concentration. Measurement of bicarbonate concentration is known to those skilled in the art and can involve using the pH sensor and a carbon dioxide sensor. A carbon dioxide sensor for measuring the partial pressure of carbon dioxide could include a modified pH sensor containing a gas permeable membrane mounted on a combination measuring/reference electrode, also known as a Severinghaus electrode. Sensors to measure the partial pressure of carbon dioxide in aqueous solution are well known in the art. The partial pressure of a gas dissolved in a liquid is the partial pressure of that gas which would be generated in a gas phase in equilibrium with the liquid at the same temperature. Once the pH and partial pressure of carbon dioxide are known the bicarbonate concentration can be calculated using the Henderson-Hasselbalch equation:

$$pH = pKa + \log HCO3-/\alpha(PCO2)$$

where PCO2 (partial pressure of carbon dioxide (mmHg) and pH are measured. The pKa and $\alpha$ (solubility coefficient of carbon dioxide in dialysate (mmol-liter–1-mmHg–1) will be calculated for the dialysate solution at a given temperature. The temperature may be measured with a temperature sensor along the dialysate flow loop 46 or a temperature sensor may be integrated into the pH measurement system. The pKa and a can be calculated by methods known to those skilled in the art. The bicarbonate concentration HCO3– can then be calculated. In certain embodiments, the pH-buffer sensor 45 is optional. An example of a commercially available pH sensor is the InPro3250i sold by Mettler Toledo (Columbus, Ohio). An example of a commercially available CO2 is the PCO2 Sensor sold by Idronaut (Italy).

In one mode of operation, as shown in FIG. 1, after the conductivity sensor 40 and pH-buffer sensor 45, the dialysate flow passes a reconstitution system 43 having an infusate pump 42 and an infusate reservoir 44. The reconstitution system 43 rebalances the dialysate to ensure it contains the appropriate amount of electrolytes and buffer. The infusate reservoir 44 can contain multiple reservoirs each containing specific compounds. For example, the infusate reservoir 44 can include a reservoir containing a concentrated electrolyte solution such as calcium acetate, magnesium acetate and potassium acetate. The infusate reservoir 44 can also contain an additional reservoir having a concentrated buffer solution such as sodium bicarbonate, or alternatively, unbuffered sodium bicarbonate or any specified desired acid or base equivalent. The acid or base equivalents are desirably equivalents suitable for use in a dialysate and can be selected by those of ordinary skill in the art. Multiple reconstitution systems 43 can be used with the dialysis system shown in FIG. 1.

Regenerated dialysate 25 passes through the dialyzer 20 and exits as spent dialysate 23. The spent dialysate 23 flow passes an ultrafiltration unit having an ultrafiltration or control pump 28 and a control reservoir 26. The control pump 28 removes fluid from the dialysate loop 46 and because of the dialysate loop's 46 controlled compliant properties, a volume of fluid is drawn across dialyzer 20 from the blood. The ultrafiltrate system acts to remove ultrafiltrate from the patient and remove any fluid added in along the dialysate loop 46, such as fluid from the reconstitution system 43. The fluid volume removed by control pump 28 is collected in the control reservoir 26. In certain embodiments, the system of FIG. 1 can also be used with an open-volume dialysate loop similar to the system shown in FIG. 3.

The system as shown in FIG. 1 can be operated through the following steps. Spent dialysate passes the urea sensor 41 and the concentration of urea in the dialysate is determined using methods described above. Dialysate exits the dialysate regeneration unit 32 and flows through degasser 39, which removes un-dissolved carbon dioxide from the dialysate. The dialysate continues to the reconstitution system 43. In this embodiment, a pH-buffer sensor 45 is not included. The reconstitution system 43 adds electrolytes and bicarbonate to the dialysate solution. The bicarbonate is contained in its own reservoir as sodium bicarbonate of some known concentration. The concentration of the bicarbonate solution infused can range from dilute solution to a saturated solution depending on volume limitations of the bicarbonate reservoir. The bicarbonate solution is pumped into the dialysate circuit loop at a variable rate depending on the dialysate urea concentration measured with the urea sensor 41 and the resulting bicarbonate concentration that results after flowing through the dialysate regeneration unit 32. For example, in certain embodiments 15% of the dialysate urea concentration will end up as bicarbonate. However, the required dialysate bicarbonate concentration can vary substantially. The rate of bicarbonate addition depends on the patient's acid-base chemistry. In one non-limiting example, a specific patient may require bicarbonate addition to the dialysate of 1.5 mmol/minute. At a given time interval of therapy, if the dialysate urea concentration is 20 mmol/liter, the resulting bicarbonate concentration added to the dialysate by urea conversion will equal 3 mmol/liter. If the dialysate is flowing at a rate of 400 ml/min, the addition of bicarbonate to the dialysate from urea will be occurring at a rate of 1.2 mmol/minute. Therefore, the bicarbonate from the reconstitution system 43 will only need to be added at a rate of 0.3 mmol/minute. If the bicarbonate in the reconstitution system 43 is at a concentration of 1000 mmol/liter, the flow rate of bicarbonate will need to be 0.3 ml/minute for that time interval. It will be understood the flow rates of bicarbonate can be similarly varied as required by those of skill in the art to achieve the desired bicarbonate concentration.

In certain embodiments, the components of the dialysate flow loop 46 have a controlled compliant volume. As such, fluid is in passive equilibrium from flowing from the extracorporeal circuit to the dialysate flow loop 46 due to the controlled compliant volume of the dialysate loop 46. The net balance of fluid is prevented from passively flowing between the flow loop 46 to the extracorporeal circuit via the dialyzer 20, since such a movement of fluid will leave a vacuum in the flow loop 46 or require the flow loop 46 to expand. Since the dialyzer can be a high-flux type that readily allows for the passage of water, there is some fluid flux back and forth across the dialyzer membrane due to the pressure differential on the blood and dialysate sides of the membrane. This is a localized phenomenon due to the low pressure required to move fluid across the membrane and is called backfiltration; however, this results in no net fluid gain or loss by the patient, as described above.

As an additional advantage of the components forming the dialysate flow loop 46 having a controlled compliant volume, the dialysate flow loop 46 can further incorporate a control or ultrafiltration pump 28 that can be operated bi-directionally to cause the movement of fluid into and out of the dialysate flow loop 46. As described above, hemodialysis does not require a net movement of fluid volume across the dialysate membrane. However, an ultrafiltrate or control pump 28 can be employed to affect ultrafiltration to provide a hemodiafiltration therapy to the patient. Specifically, the action of typical pumps contemplated by the invention function by expanding or contracting a space wherein any suitable type of pump can be used in the present invention. When the control or ultrafiltration pump 28 is provided on the dialysis flow loop 46, the flow of fluid volume to and from the dialysate flow loop 46 can be adjusted in a controlled fashion by allowing for the movement of fluid across the dialysis membrane in the dialyzer 20. The control or ultrafiltration pump 28 allows for fluid to move from the dialysate flow loop 46 to the extracorporeal circuit without creating a vacuum, wherein the operation of the control pump 28 is controlled. Likewise, the control pump 28 allows for fluid to move from the extracorporeal circuit, and hence the patient's body via the action of the control pump 28 by actively controlling flow to and from the dialysate flow loop 46. Movement of fluid between the extracorporeal circuit and the dialysate flow loop 46 can be accurately controlled and metered with removed fluid or ultrafiltrate stored in control reservoir 26. In some embodiments, the control reservoir 26 can be prefilled with water, dialysate or other fluid for addition to the dialysate flow loop 46.

Figure 2:
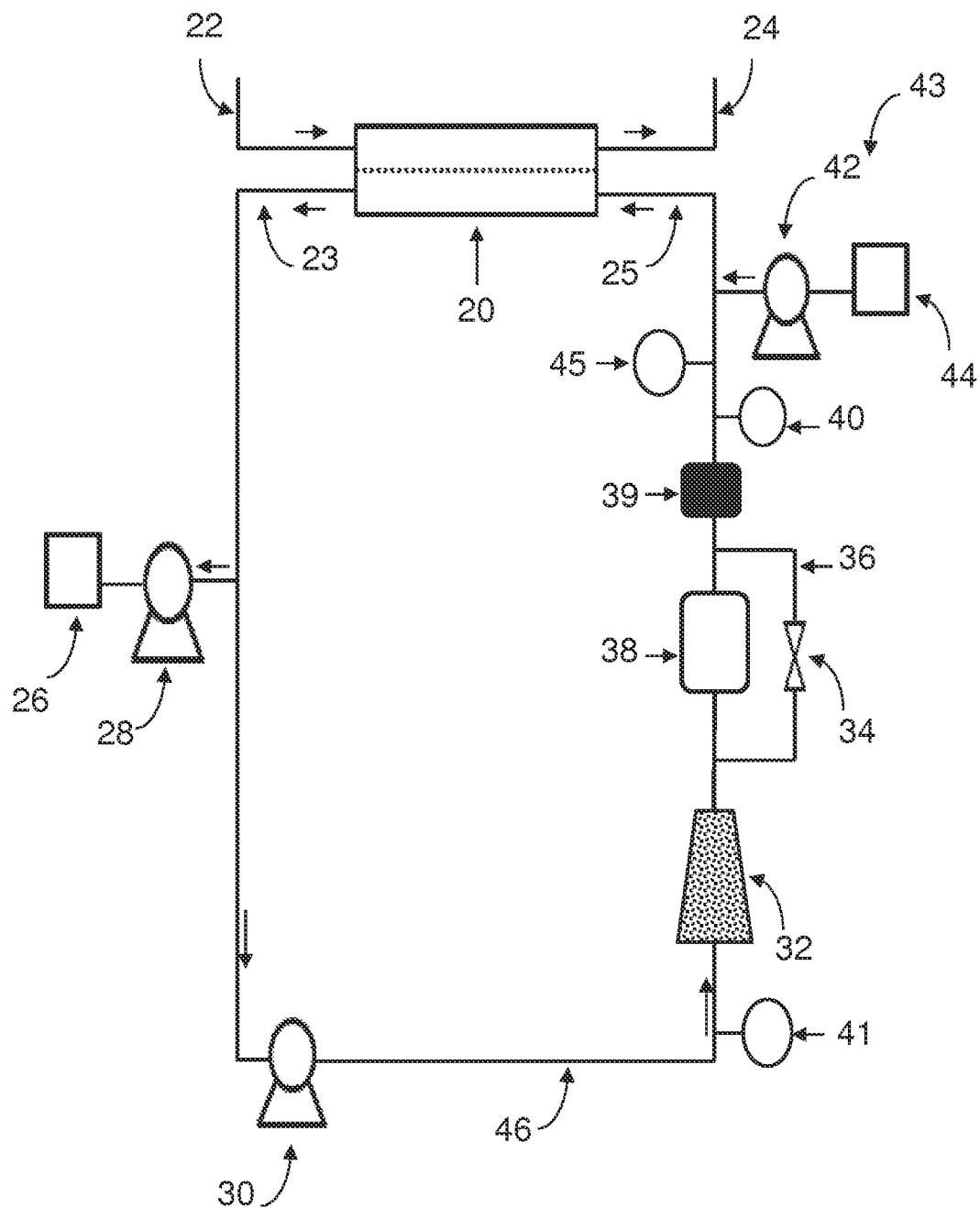
FIG. 2 is a flow diagram of a dialysate regeneration system with a controlled compliant dialysate circuit and a pH and buffer management system with a by-pass.

FIG. 2 is an example of a dialysis system similar to the system shown in FIG. 1 except the system includes a pH-buffer management system 38. Reference numbers between FIGS. refer to the same components unless noted otherwise. The dialysate exiting the dialysate regeneration unit 32 flows through a pH management system 38 or a by-pass loop 36, regulated by a by-pass regulator 34. The by-pass regulator 34 determines the amount of dialysate that passes through the pH-buffer management system 38. The by-pass regulator 34 can be a pinch valve, on/off valve, or a valve with a range of open conditions such as a needle valve. The pH-buffer management system 38 acts to acidify the dialysate. The pH-buffer management system 38 and by-pass loop 36 can be placed anywhere along flow loop 46, but preferably immediately after the dialysate regeneration unit 32. Because the dialysate regeneration unit 32 removes waste species from the dialysate, including urea and certain electrolytes, the pH-buffer management system acts in certain embodiments only on sodium-based salts. Specifically, the removal of divalent ions in the dialysate regeneration unit, such as calcium and magnesium, improves the performance of the pH-buffer management system by minimizing precipitation of the divalent salts. The use of a by-pass loop 36 is optional and may be removed if the pH-buffer management system 38 actively controls the level of acidification, which will be explained below.

After passing through the pH-buffer management system 38 and by-pass loop 36 the dialysate flow passes the degasser 39 as explained above. The pH-buffer management system serves to remove positively charged species in favor of the addition of hydrogen ions to maintain charge balance. The acidification of the dialysate in the pH-buffer management system 38 acts to convert bicarbonate in the fluid passing through the pH-buffer management system 38 to carbon dioxide. The produced carbon dioxide can be removed with the degasser 39. The degasser 39 can be used to remove un-dissolved carbon dioxide and/or dissolved carbon dioxide to a certain level in order to achieve a specific dialysate pH. The remaining components and features shown in FIG. 2 work according to the description given for FIG. 1 above.

Figure 3:
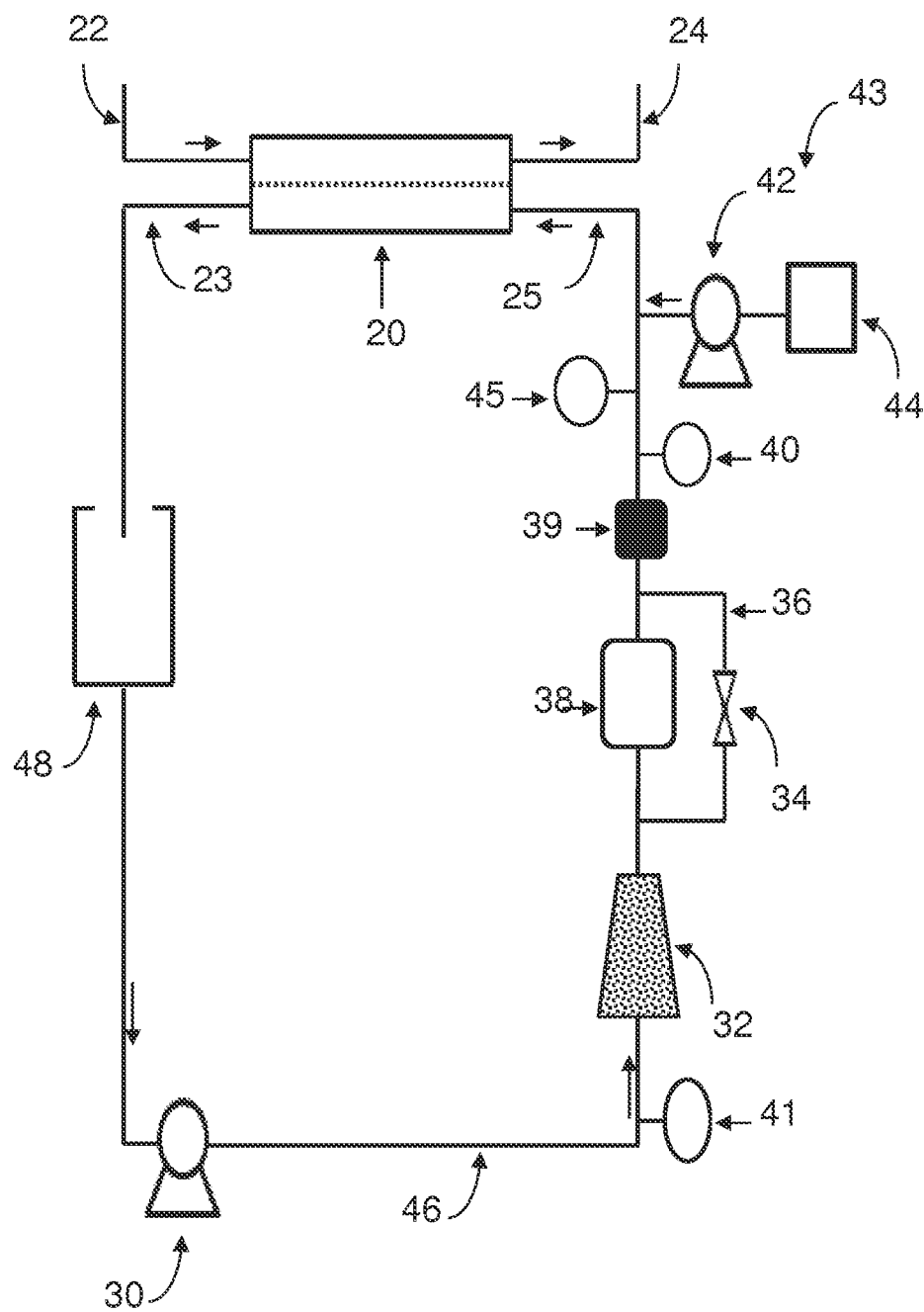
FIG. 3 is a flow diagram of a dialysate regeneration system with an open, non-fixed volume dialysate circuit and a pH and buffer management system.

FIG. 3 is an example of a dialysis system similar to that shown in FIG. 2. However, the dialysate flow loop 46 shown in FIG. 3 includes a dialysate reservoir 48 rather than the controlled compliant dialysate flow loop 46 described in FIG. 1. Dialysate reservoir 48 is a variable volume reservoir. The dialysate reservoir 48 can also be located between the dialysate regeneration system 32 and the pH-buffer management system 38, or between the pH-buffer management system 38 and the reconstitution system 43. The dialysate fluid contained in dialysate reservoir 48 can vary during the course of a hemodialysis run. Specifically, the volume will increase as ultrafiltrate is removed from the patient by filtration across dialyzer 20. The ultrafiltrate rate can be controlled by adjusting the trans-membrane pressure across the dialyzer with various valves on the blood lines and dialysate lines, or balance chambers combined with a ultrafiltration pump, or other means known to those skilled in the art.

Figure 4:
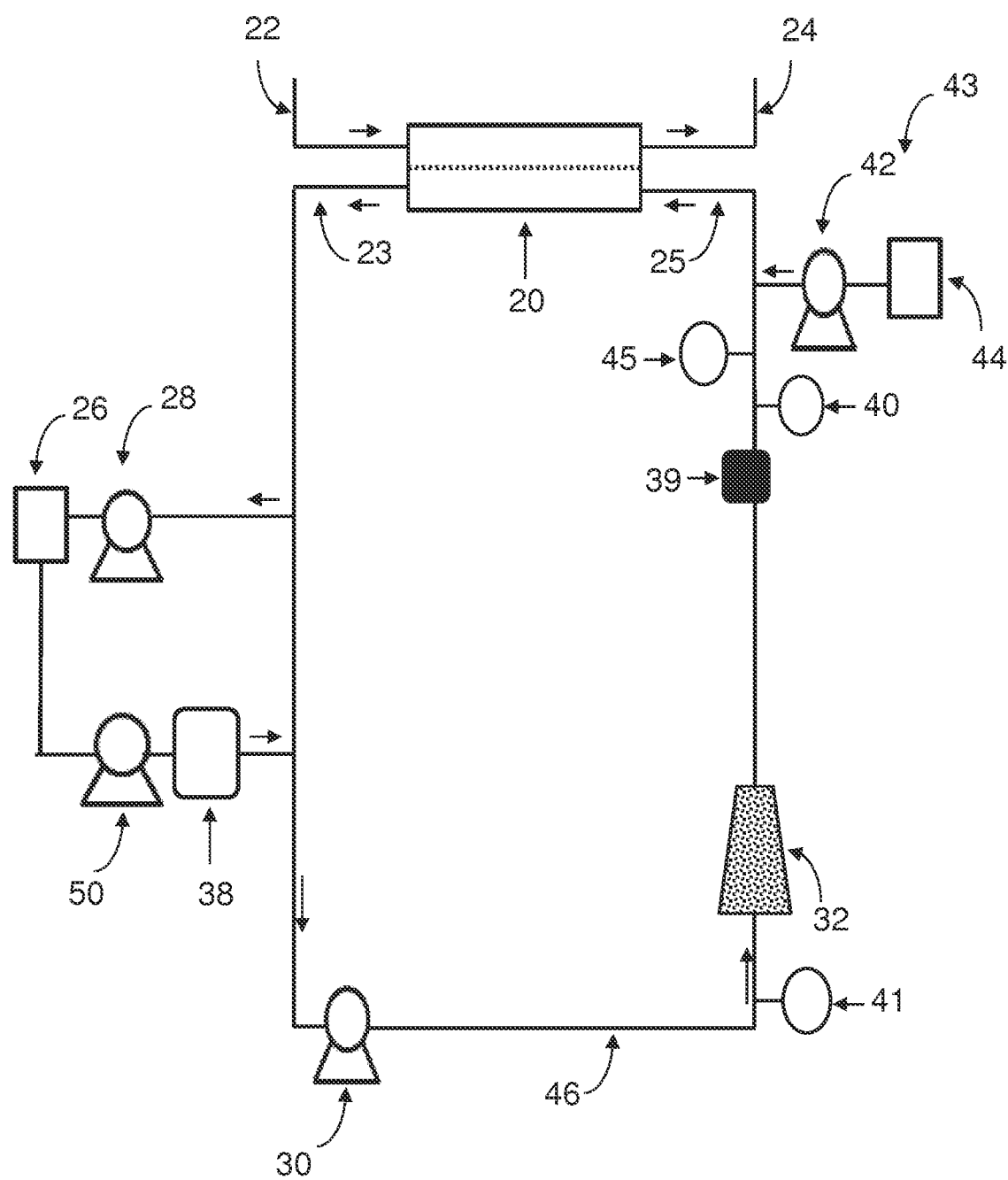
FIG. 4 is a flow diagram of a dialysate regeneration system with a controlled compliant dialysate circuit and a pH and buffer management system utilizing ultrafiltrate waste to generate a pH and buffer modifying fluid delivered before a dialysate regeneration unit.
Figure 5:
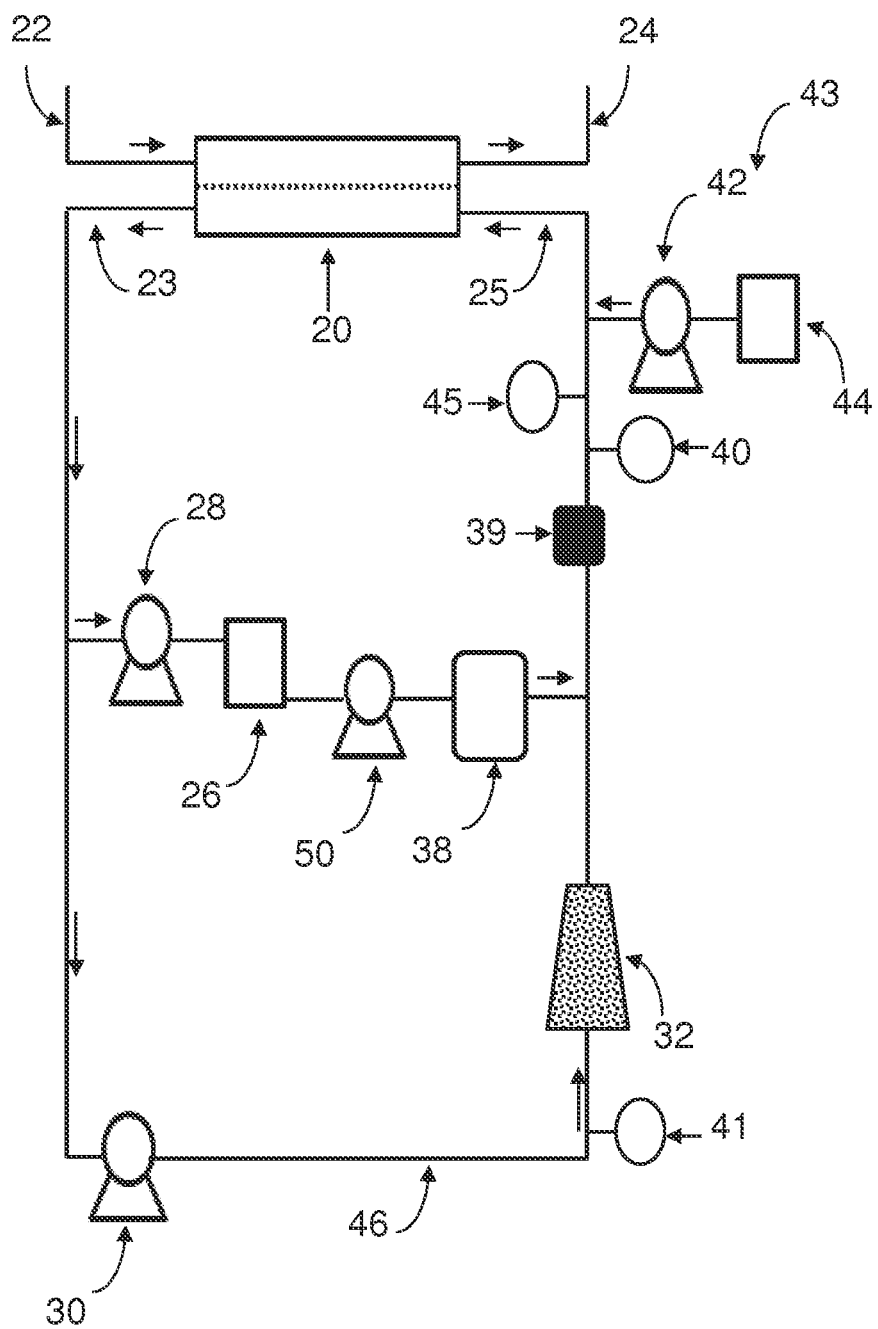
FIG. 5 is a flow diagram of a dialysate regeneration system with a controlled compliant dialysate circuit and a pH and buffer management system utilizing ultrafiltrate waste to generate a pH and buffer modifying fluid delivered after a dialysate regeneration unit.

FIGS. 4 and 5 show flow diagrams for a dialysis system with a controlled compliant dialysate flow loop 46 and a pH-buffer management system 38. The ultrafiltrate volume that is collected in the control reservoir 26 is pumped through a pH-buffer management system 38 with a pH-buffer management pump 50 and returned to the dialysate flow loop 46 to act as a pH-buffer modifying solution. The pH-buffer modifying solution is a solution generated by the pH-buffer management system 38 that reduces the pH of the working dialysate within the dialysate flow loop 46 when added thereto. As shown in FIGS. 4 and 5, the pH-buffer management system 38 increases the acidity of the ultrafiltrate stored in the control reservoir 26, which is then added to the dialysate flow loop 46 as a pH-buffer modifying solution. FIG. 4 shows a flow diagram for addition of the pH-buffer modified ultrafiltrate waste to the dialysate flow loop 46 prior to or upstream from the dialysate regeneration system 32. FIG. 5 shows a flow diagram for addition of the pH-buffer modified ultrafiltrate waste to the dialysate flow loop 46 after or downstream from the dialysate regeneration system 32. The pH-buffered-modified fluid generated from fluid in the control reservoir 26 will contain waste species and electrolytes including urea, creatinine, calcium, magnesium, and potassium. Some of these species will be removed by the pH-buffer management system 38. It is expected that the concentration of waste species and electrolytes will be low in the pH-buffered modified fluid. Therefore, addition of the pH-buffered modified fluid after the dialysate regeneration unit 32 should not have deleterious effects on the dialysis therapy.

Figure 6:
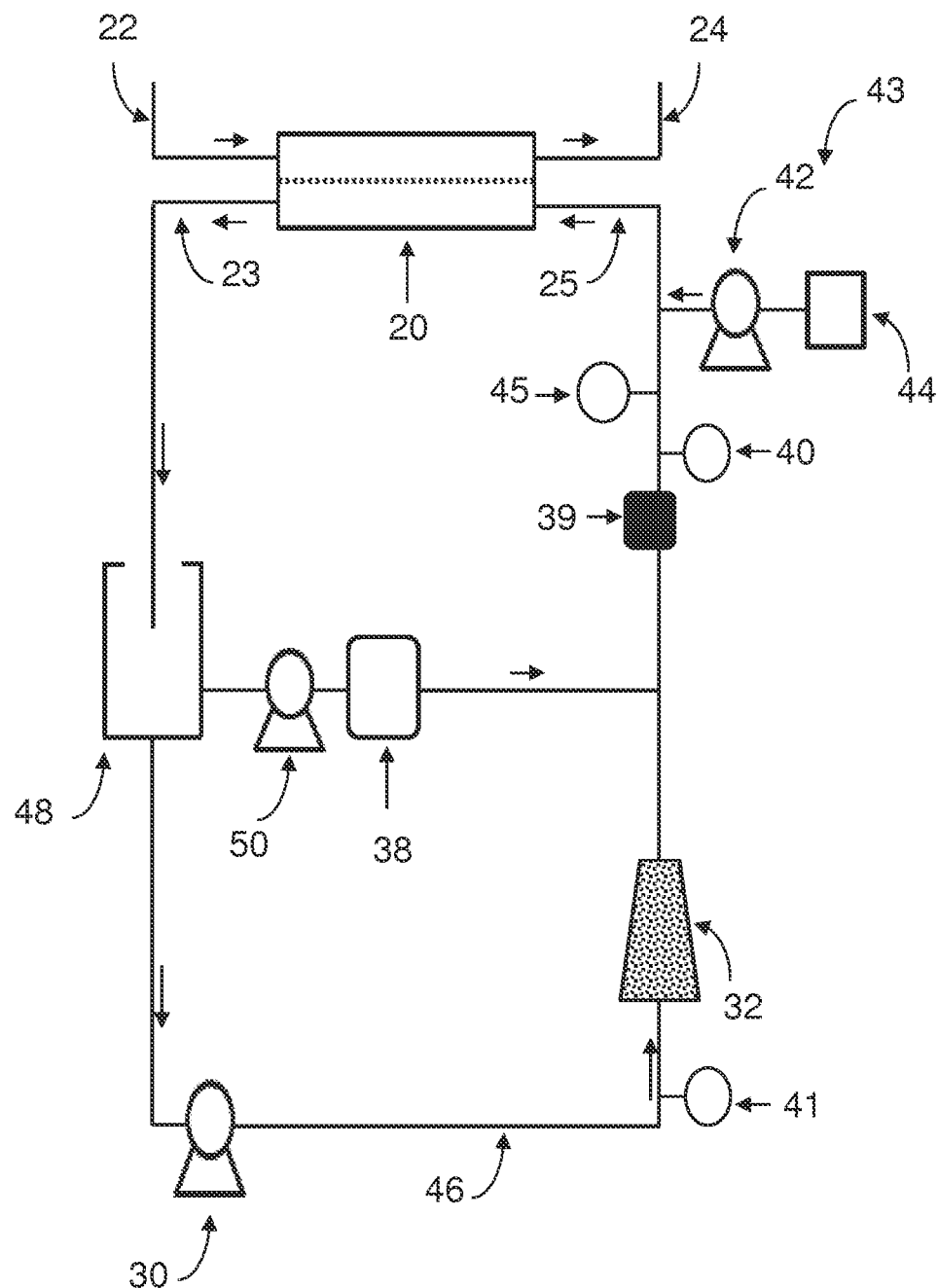
FIG. 6 is a flow diagram of a dialysate regeneration system with an open, non-fixed volume dialysate circuit and a pH and buffer management system utilizing dialysate from a dialysate reservoir to generate a pH and buffer modifying fluid delivered after a dialysate regeneration unit.
Figure 7:
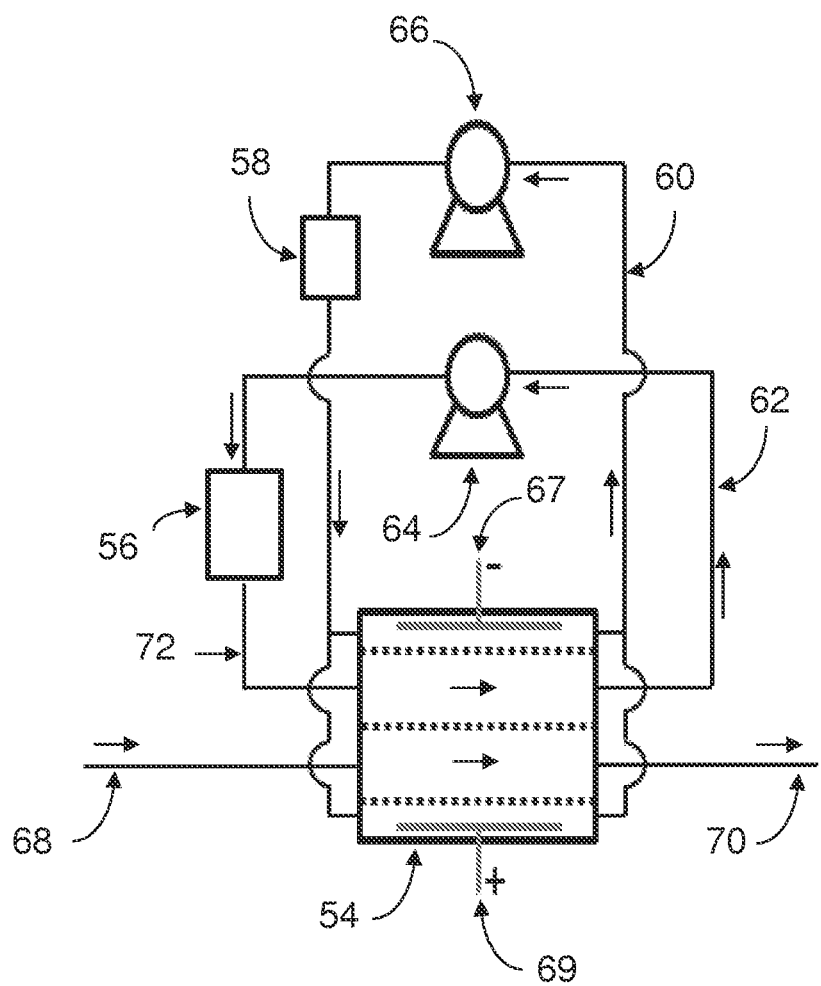
FIG. 7 is a flow diagram of a pH and buffer management system consisting of a bipolar electrodialysis cell with base concentrate and electrode rinse flow loops and dialysate or ultrafiltrate waste inlet and outlet diluate acid streams.

FIG. 6 shows a flow diagram for a dialysis system consisting of a dialysate flow loop 46 that includes a variable volume dialysate reservoir 48, similar to the flow path shown in FIG. 3. The flow diagram also includes a pH-buffer management pump 38 that draws fluid from the dialysate reservoir 48 and passes it through a pH-buffer management system 38 that acts to acidify the draw solution from dialysate reservoir 48. The solution that was drawn from the dialysate reservoir 48 and modified in acidity is then returned back to the dialysate flow loop 46. The measurements of the pH and buffer concentration of the dialysate can be used by a controller to determine the desired pH. Such measurements can also be used to determine or control the rate at which an acidified solution is infused into the dialysate. As shown in FIG. 6, the solution is returned after or downstream from the dialysate regeneration system 32, but fluid can also be returned before the dialysate regeneration system 32. FIG. 7 shows a flow diagram for a bipolar electrodialysis system that can function as a component of the pH-buffer management system identified as 38 in any one of FIGS. 1, 2, 3, 4, 5 and 6. The feed inlet 68 to the bipolar electrodialysis system can be dialysate or ultrafiltrate waste. The dialysate or ultrafiltrate enters the bipolar electrodialysis system at the feed inlet 68 and passes through an electrodialysis cell 54. The electrodialysis cell 54 has a stack of bipolar and cation exchange membranes. At each end of the membrane stack is an electrode 67 and 69 contained in an electrode compartment. The electrode compartment is either continually, or non-continuously, rinsed during operation with an electrode rinse solution contained in the electrode rinse reservoir 58 and recirculated with the electrode rinse pump 66. The electrode rinse solution can contain a sodium sulfate solution, or any other suitable electrode rinse solution. The use of sodium sulfate is preferred because oxidation of sulfate does not occur to an appreciable amount under typical operating conditions. The use of sodium chloride in the electrode rinse must be avoided to prevent the oxidation of chloride to chlorine at the electrodes, which may diffuse into the dialysate stream and contaminate the dialysate. The electrode rinse acts to continually flush reactants that may form at the electrode surfaces. For example, the electrolysis of water will occur to some extent at the electrodes resulting in the formation of hydrogen and oxygen. In some cases, it will be desirable to include a degassing module in the electrode rinse circuit to remove some of the formed gases. The degassing module can have a hydrophobic membrane vent. The stack of bipolar and cation exchange membranes results in alternating flow channels through the electrodialysis cell 54. The dialysate or ultrafiltrate passes through certain flow channels that are acidified during operation. The solution referred to as base concentrate is contained in the base concentrate reservoir 56 and recirculated through the electrodialysis cell 54 with the base concentrate pump 64 through line 62. The base concentrate solution may initially be water, or any other suitable solution.

Between therapy sessions the electrodialysis cell can be cleaned by reversing the polarity of the electrodes and flushing a cleaning solution through the cell. The cleaning solution could consist of water, saline, or a dilute acid. The dilute acid can include citric or acetic acid, or other suitable acids. Reversing the polarity of the electrodes will promote movement of ions from the base concentrate circuit to the dilute acid circuit that can be flushed from the cell. This cleaning method will extend the life of the membranes.

Figure 8:
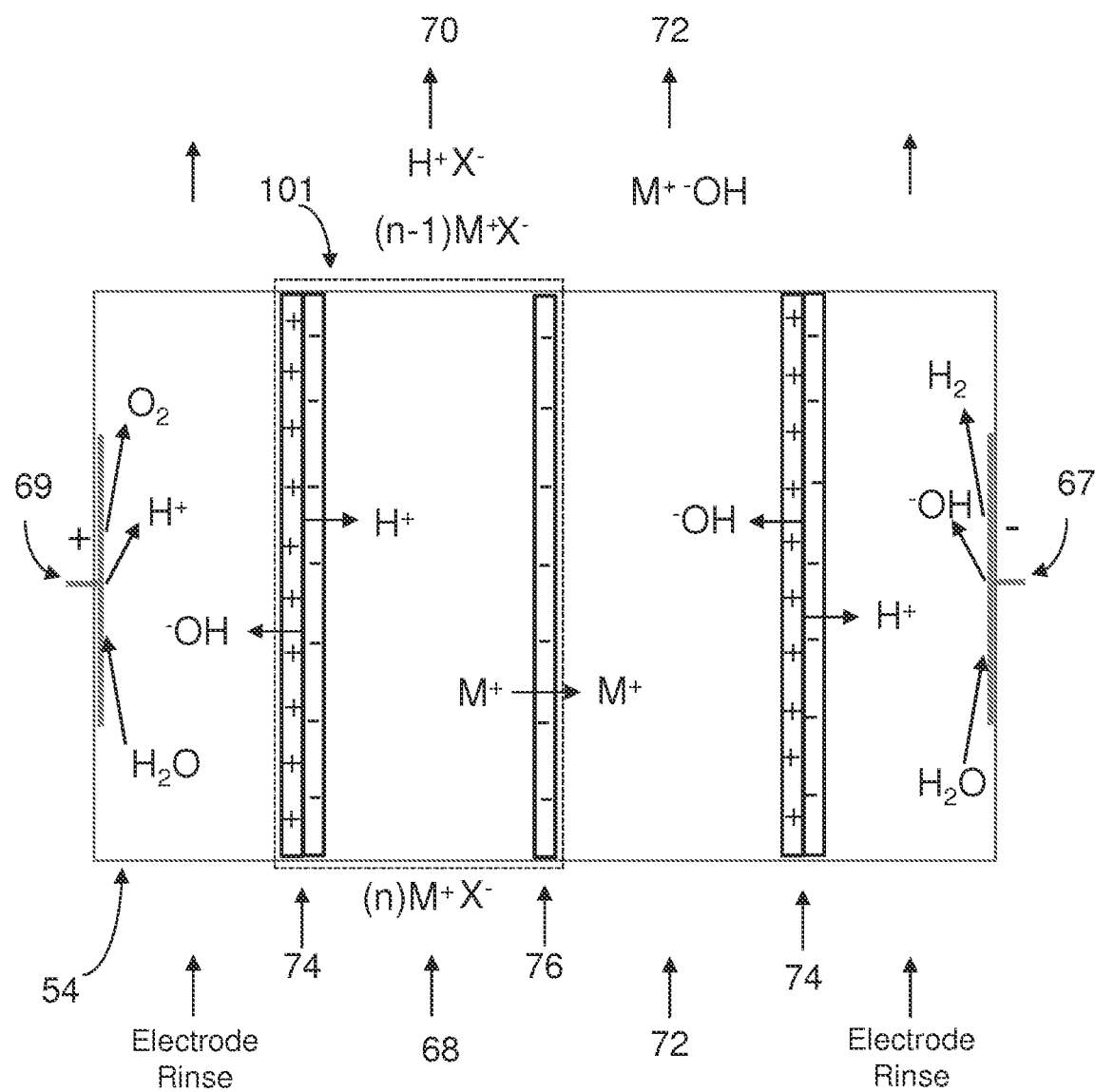
FIG. 8 is a flow diagram of a two-compartment, single unit bipolar electrodialysis cell containing bipolar membranes and a cation exchange membrane.

A more detailed flow diagram of the electrodialysis cell 54 is shown in FIG. 8. Feed solution 68, dialysate or ultrafiltrate, enters the electrodialysis cell 54 between the cation exchange side of a bipolar membrane 74 and an individual cation exchange membrane 76. The bipolar membrane 74 has an anion exchange membrane and a cation exchange membrane bonded together. Examples of bipolar membranes and cation exchange membranes that could be used include Neosepta BP-1E bipolar membrane and Neosepta CMX cation exchange membrane produced by ASTOM Corporation. The cation exchange membrane is designed to only allow cations to pass through it. The bipolar membrane is designed to not allow cations and anions to pass through it.

When a bipolar membrane is placed in an electrodialysis cell as shown in FIG. 8, an applied voltage across the electrodes 69 and 67 will result in transport of anions and cations towards the anode 69 and cathode 67, respectively. Because anions or cations cannot flow through the bipolar membranes 74, water contained in the bipolar membranes 74 is split resulting in hydrogen and hydroxyl ions. The hydroxyl anions flow out of the anion exchange membrane towards the anode 69 and cations flow out of the cation exchange membrane towards the cathode 67 as depicted in FIG. 8. Cations (M+) entering the electrodialysis cell 54 through the feed inlet 68 migrate through the cation exchange membrane 76 if an electric potential, of polarity shown, is applied across the electrodes 67 and 69. The cations (M+) combine with hydroxyl anions to form a base stream 72 that is recirculated in the electrodialysis system shown in FIG. 7. In some embodiments, the cations in the feed coming from the dialysate solution includes primarily sodium ions as cations because the other cations typically found in dialysate, such as calcium, magnesium, and potassium, are removed by the dialysate regeneration system 32. Where ultrafiltrate stored in control reservoir 26 is used as feed solution to the pH-buffer management system, the cations in the feed coming from control reservoir 26 include sodium, calcium, magnesium and potassium. The hydrogen cations generated in the bipolar membranes combine with the anions (X−) from the feed solution 68 resulting in an acid solution 70 exiting the electrodialysis cell 54 as shown in FIG. 8. The anions in the feed solution 68 can include chloride, bicarbonate, and acetate, or other anions found in the dialysate or ultrafiltrate waste solutions. As shown in FIG. 8, the electrode reactions that occur at the cathode 67 and anode 69, result in hydrogen and oxygen gas generation. The potential applied across the electrodes will influence the rate of acid formation. A higher potential will result in more acid formation. The applied potential can be varied to achieve a specific acidification of the dialysate or ultrafiltrate solution. The bipolar electrodialysis cell 54 shown in FIG. 8 illustrates a single cell stack. In practice multiple cell stacks could be contained in the cell 54 between the electrodes 67 and 69. The unit cell is illustrated by the dashed line 101. Multiple unit cells 101 can be stacked together to increase the surface area of the membranes and increase the rate of acid formation for a given potential across the electrodes 67 and 69. The precise number of stacked unit cells will vary depending on the required surface area and can be determined by those of skill in the art.

The acidified solution 70 exiting the electrodialysis system converts a certain amount of bicarbonate in the dialysate contained in the dialysate flow loop 46 to carbon dioxide, which results in a decrease of the bicarbonate ion concentration in the dialysate due to a shift in equilibrium caused by the addition of acid. Non-dissolved carbon dioxide can be removed with the degasser 39 shown in the various FIGS.

Figure 9A:
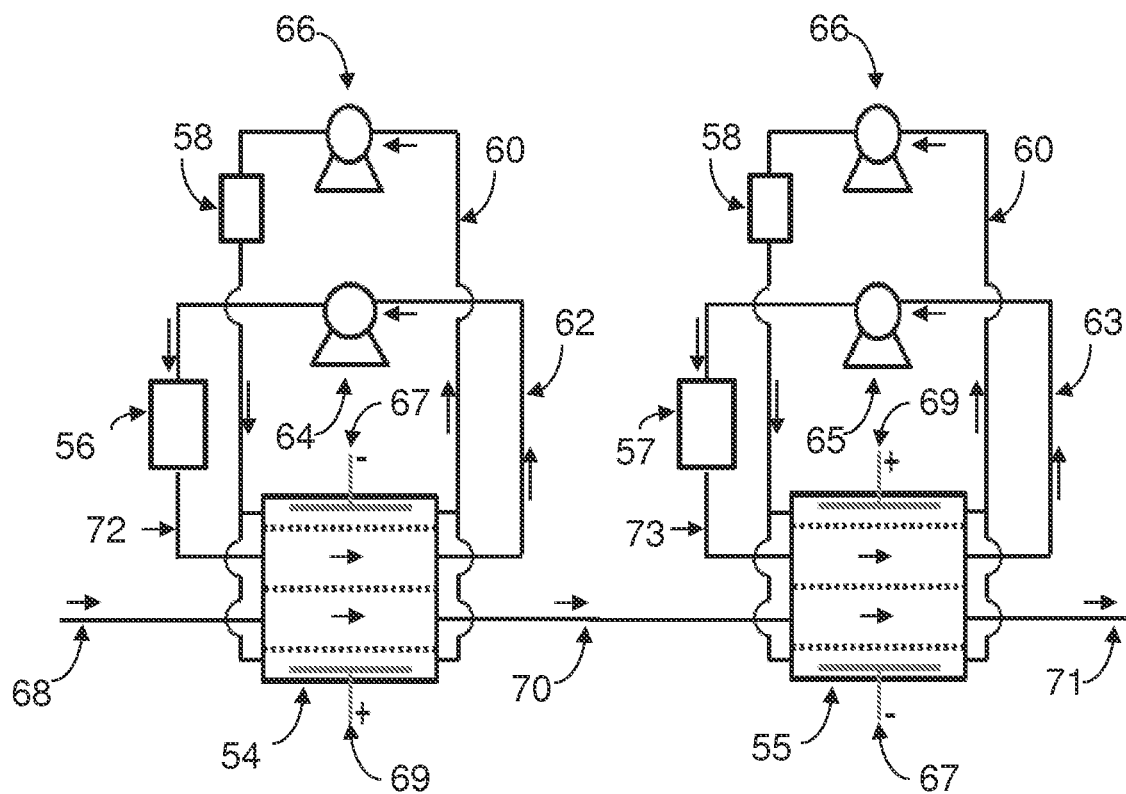
FIG. 9A is a flow diagram of a pH and buffer management system consisting of two bipolar electrodialysis cells in series, one with base concentrate and electrode rinse flow loops and one with acid concentrate and electrode rinse flow loops and dialysate or ultrafiltrate waste inlet and outlet streams.

FIG. 9A shows a pH-buffer management system 38 consisting of two bipolar electrodialysis cells placed in series. The first bipolar electrodialysis cell 54 consists of the same components and functions the same as the bipolar electrodialysis cell 54 shown in FIG. 7. The second bipolar electrodialysis cell 55 is similar to the first cell 54 except the feed stream 70 passes through a flow path in the cell that is depleted of anions in exchange for hydroxyl ions, resulting in an increase of the solution pH. Therefore, when a potential is applied across the anode 69 and cathode 67 of the second bipolar electrodialysis cell 55 a basic stream 71 exits the cell. Acid will be generated in an acid concentrate flow loop 73 and be recirculated by an acid concentrate pump 65. Acid is contained in acid concentrate reservoir 57 and recirculated through the electrodialysis cell 55 with the base concentrate pump 65 through line 63. In operation bicarbonate ions will move into the acid concentrate flow loop 73 and convert to carbon dioxide. Therefore, it may be necessary to include a degassing module in the acid concentrate flow loop 73 of the types described above in order to remove accumulated carbon dioxide.

The feed solution 68 shown in FIG. 9A could consist of dialysate or ultrafiltrate waste. Upon entering the bipolar electrodialysis cells a potential can be applied across the electrodes of the first cell 54 or the second cell 55 depending on the need to increase or decrease the pH of the feed solution 68. The bipolar electrodialysis cells 54 and 55 shown in FIG. 9A can also be arranged in parallel, which requires a flow regulator at the inlet to each cell to direct the dialysate or ultrafiltrate waste flow through either the acidifying cell 54 or the basic cell 55.

Figure 9B:
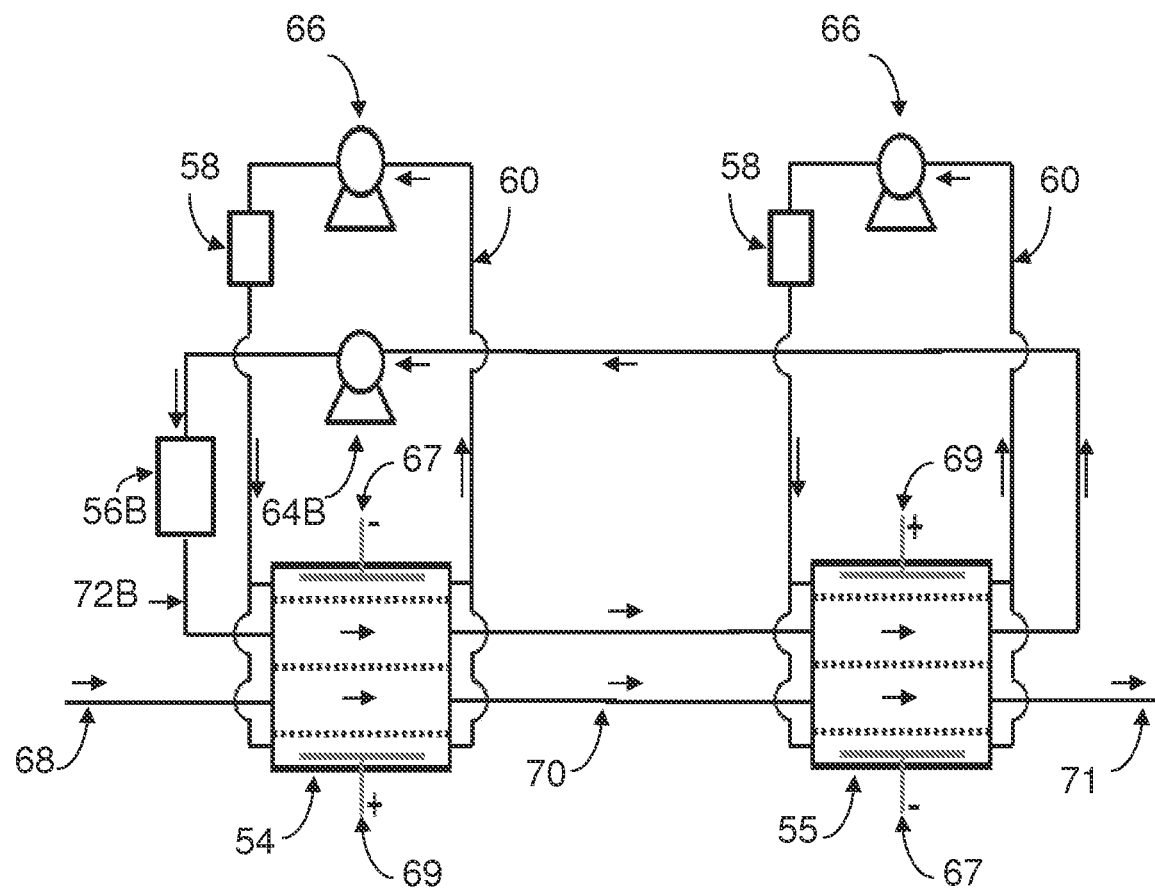
FIG. 9B is a flow diagram of a pH and buffer management system consisting of two bipolar electrodialysis cells in series with a shared concentrate flow loop, individual electrode rinse flow loops, and dialysate or ultrafiltrate waste inlet and outlet streams.

FIG. 9B shows a pH-buffer management system 38 similar to the system shown in FIG. 9A. However, the concentrate flow loop 72B, concentrate reservoir 56B and concentrate recirculating pump 64B are shared between the two bipolar electrodialysis cells 54 and 55. Therefore, during acidification of the feed stream 68 in the first electrodialysis cell 54 a base concentrate will be generated in the concentrate flow loop 72B. Also, while the pH is being raised in the feed stream 70 to the second electrodialysis cell 55, an acid concentrate will be generated in the concentrate flow loop 72B. The acid and base concentrates generated will neutralize each other to some extent and will keep the pH closer to 7. In certain embodiments the electrode rinse flow loops 60, electrode rinse reservoir 58 and electrode rinse recirculating pump 66 may also be combined into a single unit and shared between both electrodialysis cells.

Figure 10:
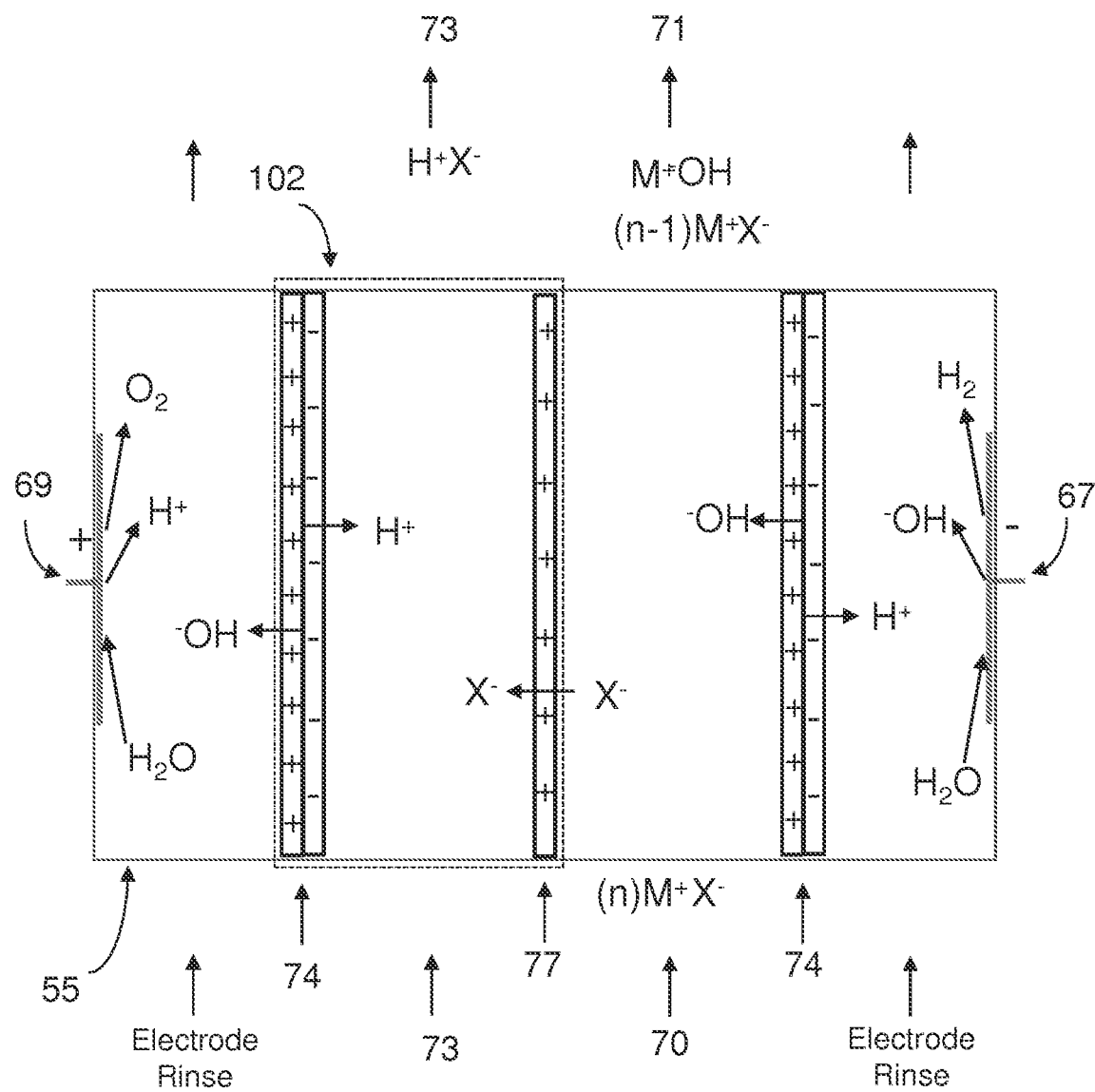
FIG. 10 is a flow diagram of a two-compartment, single unit bipolar electrodialysis cell containing bipolar membranes and an anion exchange membrane.

FIG. 10 is a more detailed flow diagram of the second bipolar electrodialysis cell 55 shown in FIG. 9A and FIG. 9B. The feed solution 70 enters the bipolar electrodialysis cell 55 between the cation exchange side of a bipolar membrane 74 and an individual anion exchange membrane 77. The bipolar membrane 74 consists of an anion exchange membrane and a cation exchange membrane bonded together. Examples of bipolar membranes and anion exchange membranes that could be used include Neosepta BP-1E bipolar membrane and Neosepta AMX anion exchange membrane produced by ASTOM Corporation. The anion exchange membrane is designed to only allow anions to pass through it. The bipolar membrane is designed to not allow cations and anions to pass through it. When a bipolar membrane is placed in the bipolar electrodialysis cell 55 as shown in FIG. 9A, an applied voltage across the electrodes 69 and 67 will result in transport of anions and cations towards the anode 69 and cathode 67 respectively. Because anions or cations cannot flow through the bipolar membranes 74 water contained in the bipolar membranes 74 is split resulting in hydrogen and hydroxyl ions. The hydroxyl anions flow out of the anion exchange membrane towards the anode 69 and anions flow out of the anion exchange membrane towards the anode 67 as depicted in FIG. 10. Anions (X−) entering the second electrodialysis cell 55 through the feed inlet 70 migrate through the anion exchange membrane 77 if an electric potential, of polarity shown, is applied across the electrodes 67 and 69. The anions (X−) combine with hydrogen ions to form an acid stream 73 that is recirculated in the second electrodialysis system shown in FIG. 9A. The cations in the feed coming from the dialysate solution include sodium because the other cations typically found in dialysate such as calcium, magnesium, and potassium are removed by the dialysate regeneration system 32. The cations in the feed coming from the ultrafiltrate waste include sodium, calcium, magnesium and potassium. The hydroxyl anions generated in the bipolar membranes combine with the cations (M+) from the feed solution 70 resulting in a basic solution 71 exiting the electrodialysis cell 55 as shown in FIG. 10. The anions in the feed solution 68 could include chloride, bicarbonate, and acetate, or other anions found in the dialysate or ultrafiltrate waste solutions. Also, shown in FIG. 10 are the electrode reactions that occur at the cathode 67 and anode 69, which result in hydrogen and oxygen gas. The potential applied across the electrodes will influence the rate of base formation. A higher potential will result in more base formation. The applied potential can be varied to achieve a specific increase in pH of the dialysate or ultrafiltrate solution. The bipolar electrodialysis cell 55 shown in FIG. 10 illustrates a single cell stack. In practice multiple cell stacks could be contained in the cell 55 between the electrodes 67 and 69. The unit cell is illustrated by the dashed line 102. Multiple unit cells 102 can be stacked together by those of ordinary skill in the art to increase the surface area of the membranes and increase the rate of base formation for a given potential across the electrodes 67 and 69.

The basic solution 71 exiting the electrodialysis system converts a certain amount of carbon dioxide in the dialysate to bicarbonate, resulting in an increase of the bicarbonate concentration in the dialysate. In situations where the ultrafiltrate waste is being passed through the bipolar electrodialysis cell 55 to increase the pH of the solution, care must be taken to avoid precipitation of the calcium and magnesium, by controlling the level of base generation in the cell. In certain embodiments, it can be preferred to use the configuration shown in FIG. 9A and FIG. 10 on the dialysate after the dialysate regeneration unit 32 because the dialysate solution will be free of calcium and magnesium salts.

Figure 11:
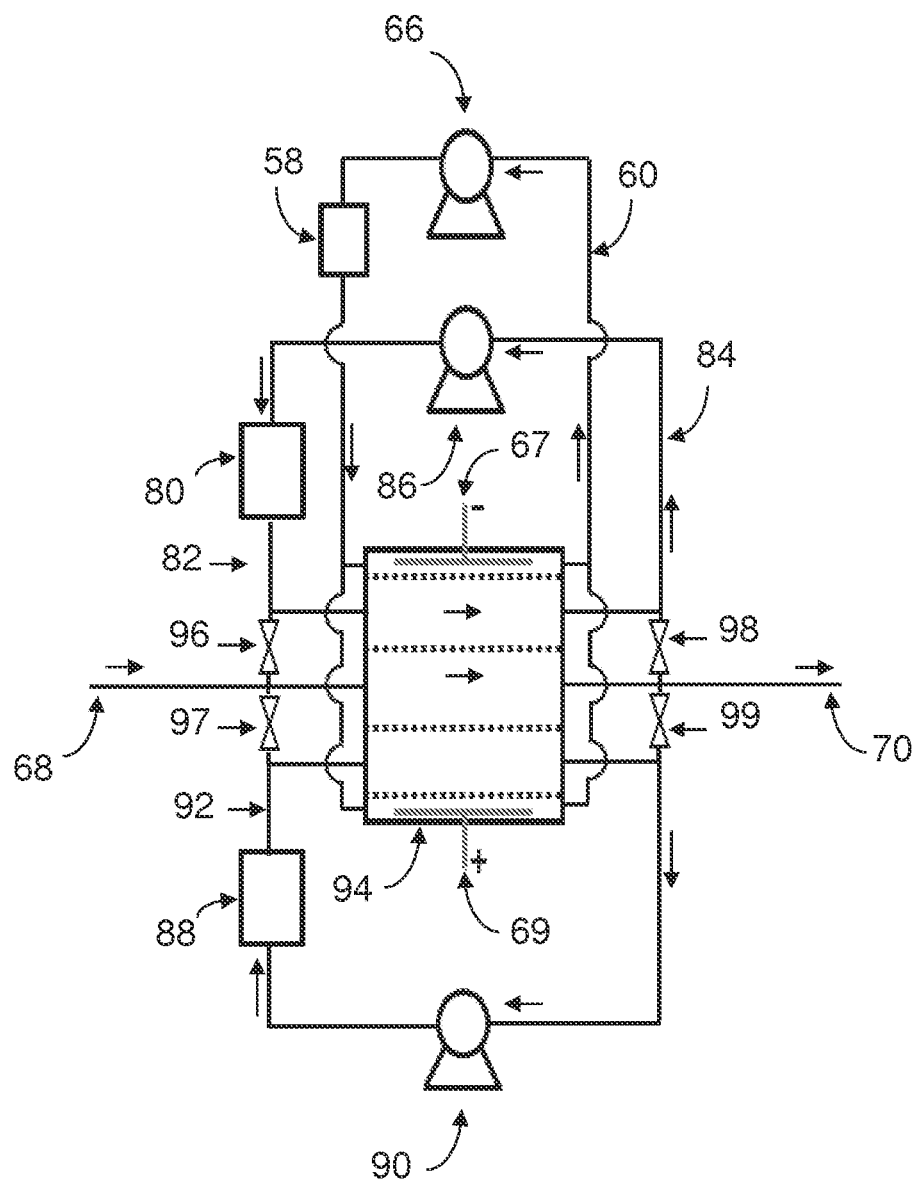
FIG. 11 is a flow diagram of a pH and buffer management system consisting of a three-compartment bipolar electrodialysis cell with acid concentrate, base concentrate and electrode rinse flow loops and dialysate or ultrafiltrate waste inlet and outlet streams.

FIG. 11 shows a flow diagram for pH-buffer management system consisting of a three compartment bipolar electrodialysis cell 94. Dialysate or ultrafiltrate waste feed solution 68 enters the bipolar electrodialysis cell 94 and generates an acidic solution 92 and a basic solution 82. The acidic solution 92 is recirculated in an acid flow loop and reservoir 88 and the basic solution 82 is recirculated in a base flow loop and reservoir 80. Acid recirculation occurs with pump 90 and base recirculation occurs with pump 86. The electrode rinse solution reservoir 58 and electrode rinse flow loop 60 function as previously described in FIGS. 7 and 9. The acid flow loop 92 includes flow regulators 97 and 99 that allow a portion of the dialysate or ultrafiltrate waste feed solution 68 to be diverted into and out of the acid flow loop 92 thereby acidifying the dialysate or ultrafiltrate waste. Likewise, the base flow loop 82 includes flow regulators % and 98 that allow a portion of the dialysate or ultrafiltrate waste feed solution 68 to be diverted into and out of the base flow loop 82 thereby increasing the pH of the dialysate or ultrafiltrate waste. The flow regulators 96, 97, 98 and 99 can include 2-way valves. The flow regulators 97 and 99 can be replaced with a single 3-way valve and the flow regulators % and 98 can be replaced with a single 3-way valve. Other arrangements, known to those skilled in the art, for the flow regulators can also be used. The flow regulators could be of the type described for the by-pass flow loop illustrated in FIGS. 2 and 3.

Figure 12:
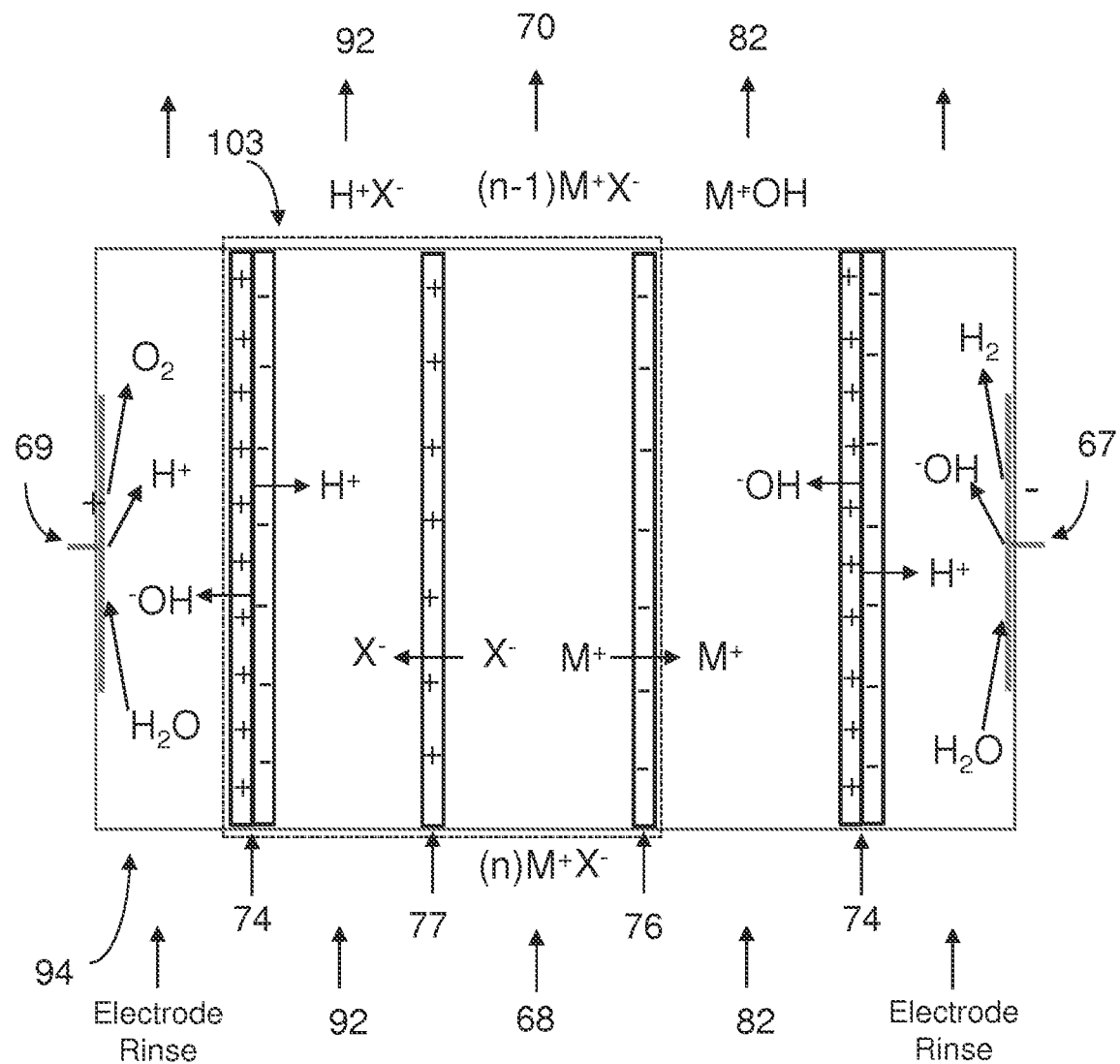
FIG. 12 is a flow diagram of a three-compartment, single unit bipolar electrodialysis cell having bipolar membranes, cation exchange membranes and anion exchange membranes.

FIG. 12 is a detailed flow diagram of the three compartment electrodialysis cell 94 shown in FIG. 11. The feed solution 68, consisting of dialysate or ultrafiltrate waste, enters the cell between a cation 76 and anion 77 exchange membranes. Anions (X−) flow through the anion exchange membrane 77 towards the anode 69 and collect in the acid flow path 92. The bipolar membrane 74 contacting the acid flow path 92 produces hydrogen ions that combine with the anions (X−) in the dialysate or ultrafiltrate waste. The cations (M+) flow through the cation exchange membrane 76 towards the cathode 67 and collect in the base flow path 82. Hydroxyl ions are created at the bipolar membrane 74 contacting the base flow path 82 and combine with cations (M+) in the dialysate or ultrafiltrate waste.

The bipolar electrodialysis cell 94 shown in FIG. 12 illustrates a single cell stack. In practice multiple cell stacks could be contained in the cell 94 between the electrodes 67 and 69. The unit cell is illustrated by the dashed line 103. Multiple unit cells 103 can be stacked together to increase the surface area of the membranes and increase the rate of base formation and acid formation for a given potential across the electrodes 67 and 69.

The pH-buffer management system 38 in some embodiments can be an acid feed solution instead of a bipolar electrodialysis system. The acid feed solution could be contained in a reservoir and delivered to the dialysate solution by a pump. Suitable acids could include hydrochloric acid, phosphoric acid, acetic acid, citric acid or other suitable acids.

In some embodiments the pH-buffer management system 38 can be controlled using the pH-buffer sensor 45 shown in the various figures and described above. For example, a particular patient may require a constant dialysate bicarbonate concentration of the dialysate entering 25 the dialyzer 20. After exiting the dialyzer 20 the spent dialysate 23 will contain an unknown level of bicarbonate and urea. After passing through the dialysate regeneration unit 32 the urea will contribute additional bicarbonate. Measurement of the dialysate bicarbonate concentration with sensor 45 will determine the level of acidification necessary to remove excess bicarbonate from the dialysate, if necessary. Also, if bicarbonate needs to be added to the dialysate the reconstitution system 43 can be used.

Figure 13:
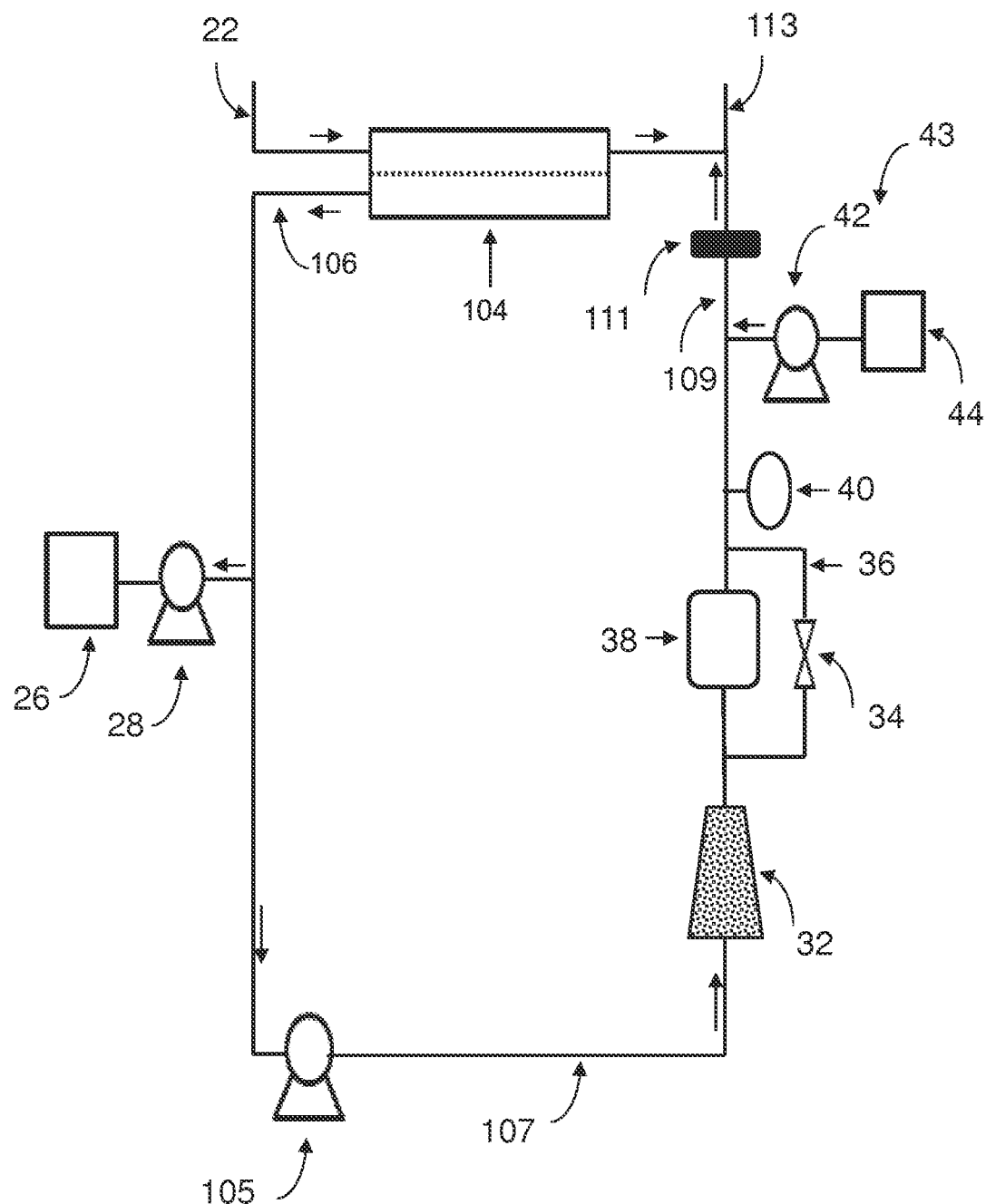
FIG. 13 is a flow diagram of a hemofiltration regeneration system with a closed, fixed-volume filtration circuit and a pH and buffer management system.

FIG. 13 shows a flow diagram for a hemofiltration system utilizing a dialysate regeneration unit 32 and a pH-buffer management system 38. The blood in line 22 enters a hemofilter 104 and a portion is filtered across membranes contained in the hemofilter 104. The hemofilter 104 can consist of a hollow-fiber dialyzer, plate-and-frame dialyzer, or other suitable hemofilters. The hemofilter 104 could contain high flux or low flux membranes made from polysulfone, polyethersulfone, poly(methyl methacrylate), cellulose, modified-cellulose or other suitable materials. The filtration pump 105 determines the amount of filtrate coming across the hemofilter. The filtrate 106 exiting the hemofilter 104 flows passes an ultrafiltration pump 28 whereby ultrafiltrate is removed from the filtrate and collected in an ultrafiltration reservoir 26. The filtrate then passes through a dialysate regeneration unit 32, pH-buffer management system 38, and infusate system 43 as described above. The regenerated filtrate 109 then passes through a microbial filter 111 before being directly infused into the blood as replacement fluid in line 113. The microbial filter 111 could include an ultrafilter filter, sterile filter, or other suitable microbial filters. The microbial filter 111 could contain membranes made from the same materials suitable for the hemofilter, preferably with pore sizes 0.2 microns or smaller. The microbial filter 111 may remove both viable organisms and endotoxin. The microbial filter may be a single filter, or multiple filters, including redundant filters. The hemofiltration system shown in FIG. 13 has a fixed-volume filtrate flow loop 107. Hemofiltration has certain benefits over hemodialysis including higher convective clearance which increases the clearance rate of middle molecular weight species like beta-2-microglobulin.

Figure 14:
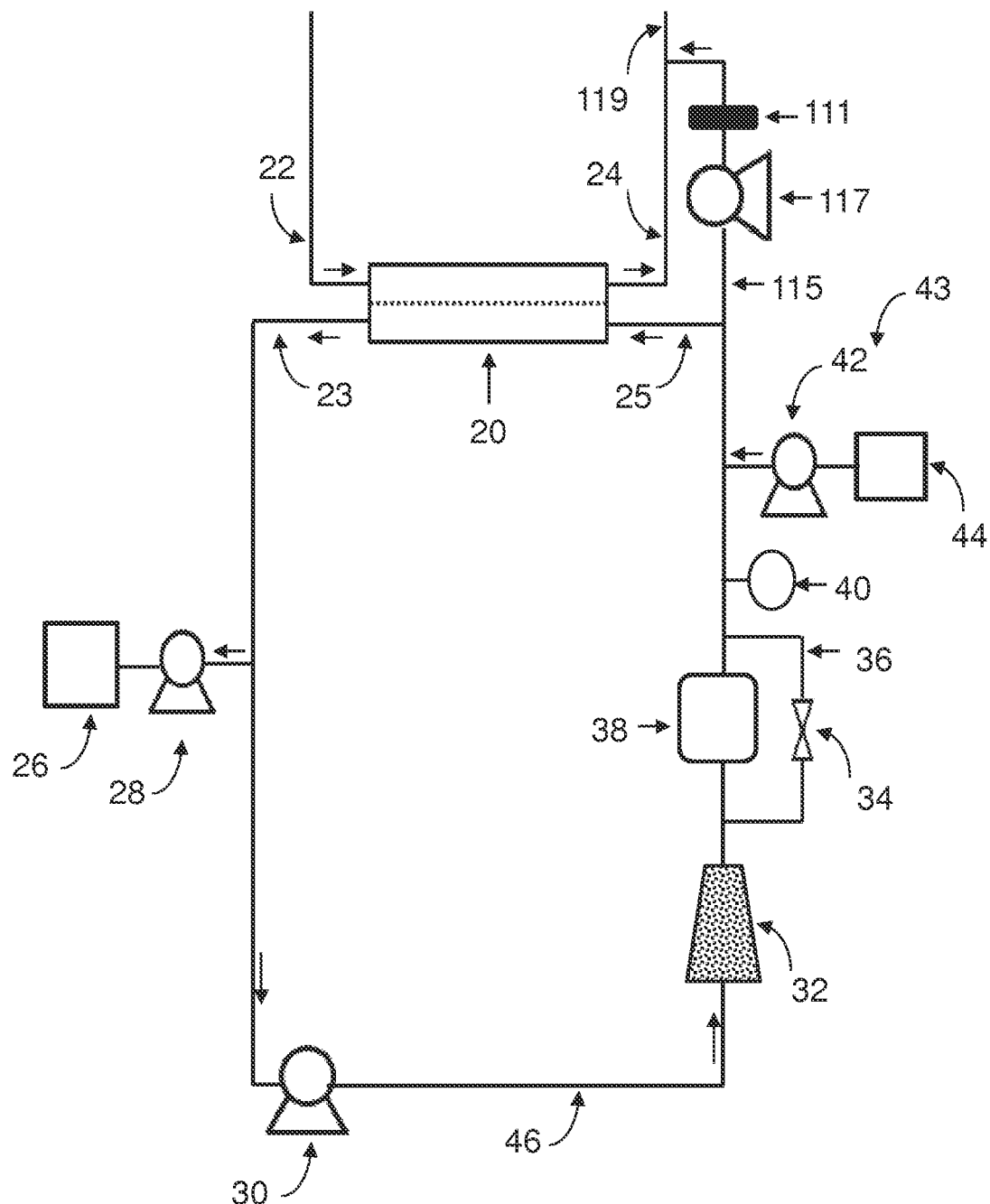
FIG. 14 is a flow diagram of a hemodiafiltration regeneration system with a closed, fixed-volume diafiltration circuit and a pH and buffer management system.

FIG. 14 shows a flow diagram for a hemodiafiltration system utilizing a dialysate regeneration unit 32 and a pH-buffer management system 38. The blood in line 22 enters a dialyzer 20 and a portion is filtered across membranes contained in the dialyzer 20. The dialyzer 20 could consist of a hollow-fiber dialyzer, plate-and-frame dialyzer, or other types of dialyzers. The dialyzer 20 could contain high flux or low flux membranes made from polysulfone, polyethersulfone, poly(methyl methacrylate), cellulose, modified-cellulose or other suitable materials. The dialysate 23 exiting the dialyzer 20 flows passes an ultrafiltration pump 28 whereby ultrafiltrate is removed from the dialysate and collected in an ultrafiltration reservoir 26. The dialysate is recirculated in the dialysate flow loop 46 with a dialysate pump 30. The dialysate then passes through a dialysate regeneration unit 32, pH-buffer management system 38, and infusate system 43 as described above. A portion of the regenerated dialysate 115 is removed from the dialysate flow loop 46 with the replacement fluid pump 117 passed through a microbial filter 111 and then directly infused into the blood as replacement fluid into line 119. The control pump 117 can prevent flow of regenerated dialysate back to the patient when not desired by pressurizing a portion of the line or by not operating or creating a block in the line. Alternatively, a control valve (not shown) can be placed at a junction between the control pump 117 and a dialysate return line to the dialyzer 20. The control valve can be 2-way or 3-way as required by the dialysate flow loop 46 and prevent flow to the patient. When flow of the regenerated dialysate back to the patient is desired, control pump 117 can pump and allow flow to the patient, or the control valve can be operated to allow flow. The specific arrangement of valves and pumps and types thereof to accomplish the requirements of the invention are within the ordinary skill of those in the art. The microbial filter 111 could include an ultrafilter filter, sterile filter, or other suitable microbial filters. The microbial filter 111 could contain membranes made from the same materials suitable for the dialyzer, preferably with pore sizes 0.2 microns or smaller. The microbial filter 111 may remove both viable organisms and endotoxin. The microbial filter may be a single filter, or multiple filters, including redundant filters. The hemodiafiltration system shown in FIG. 14 has a fixed-volume dialysate flow loop 46. Hemodiafiltration combines the benefits achieved with hemodialysis and hemofiltration, including maximum small molecule diffusive clearance and maximum middle molecule convective clearance.

Figure 15:
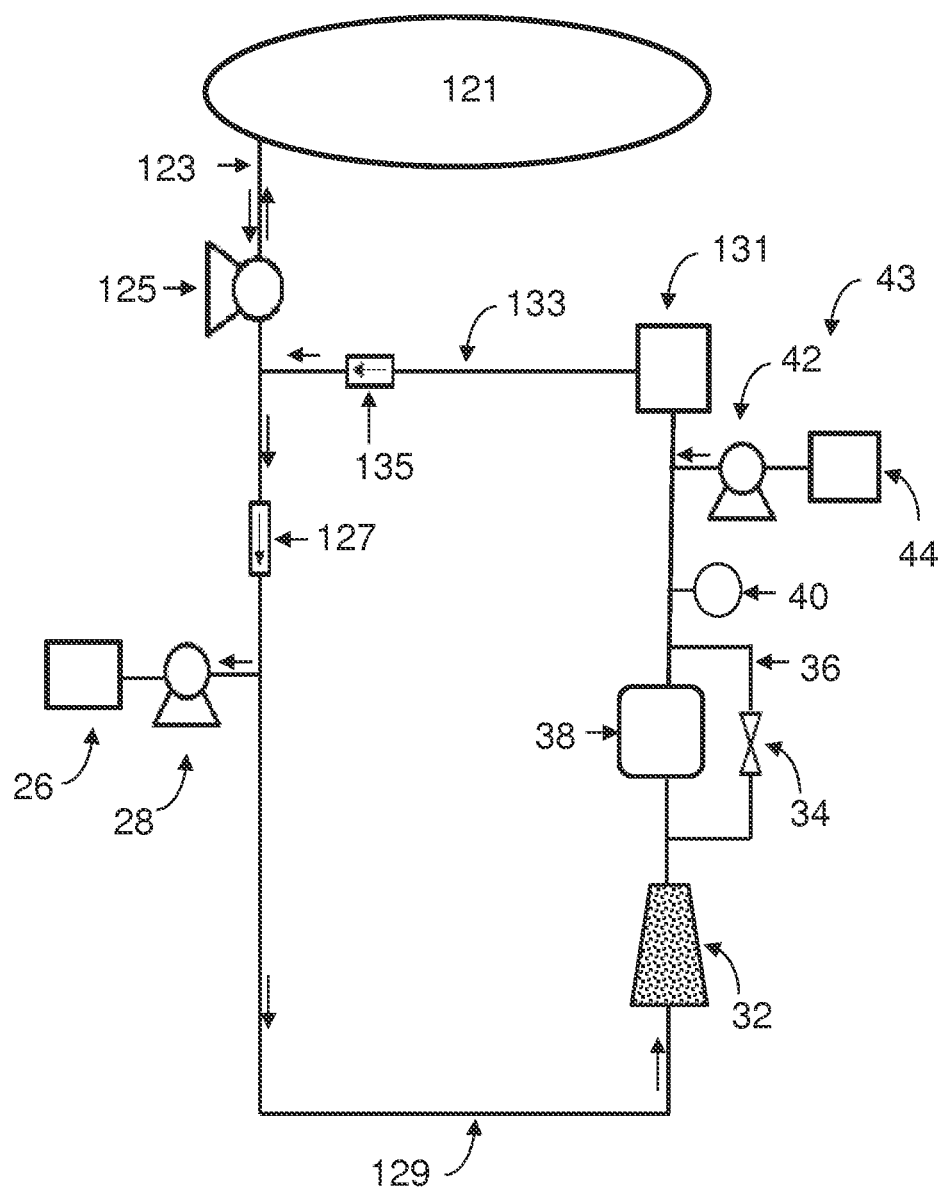
FIG. 15 is a flow diagram of a peritoneal dialysate regeneration system and a pH and buffer management system.

FIG. 15 shows a flow diagram for a peritoneal dialysis system utilizing a dialysate regeneration unit 32 and a pH-buffer management system 38. Initially, a patient's peritoneal cavity 121 is filled with a certain volume of dialysate. After a certain period of time spent dialysate is drawn out of the peritoneal cavity 121 through a catheter 123 with a reversible dialysate pump 125. The spent dialysate flows through a check valve 127 and is prevented from flowing through flow line 133 because of a check valve 135. The spent dialysate continues through the dialysate regeneration unit 32 via flowpath 129 to pH-buffer management system 38 and the infusate system 43. In the case of peritoneal dialysis, the infusate system 43 will include infusate containing high levels of glucose or icodextrin in certain embodiments. The regenerated dialysate is collected in a dialysate reservoir 131. After a desired amount of regenerated dialysate has been collected in the dialysate reservoir 131 the dialysate pump 125 is reversed and fluid is drawn out of the dialysate reservoir 131. The fluid flows through a check valve 135 and is directed through the catheter 123 back into the peritoneal cavity. Those skilled in the art will recognize that other configurations of pumps and valves can accomplish the same function, for example, valves 127 and 135 can be combined into a single 3-way valve, or pump 125 may be non-reversible if valves 127 and 135 are 2-way valves and pump 125 is placed downstream from valve 127.

This process can be continued until the dialysate regeneration system is exhausted or until the therapy is complete. At the end of a therapy the patient will have collected a certain volume of ultrafiltrate in their peritoneal cavity. The ultrafiltrate can be removed using the ultrafiltration pump 28 and collected in the ultrafiltration reservoir 26. Likewise, during the therapy, while spent dialysate is being removed from the patient, a portion of the spent dialysate can be removed as ultrafiltrate with the ultrafiltrate pump 28. However, the amount of ultrafiltrate a patient generates is variable and depends on several factors including properties of their peritoneum, dialysate composition, and patient fluid volume, or overload. Therefore, care must be taken when operating the ultrafiltrate pump 28 during the therapy in order to avoid depleting the dialysate contained in the peritoneal cavity 121.

It will be apparent to one skilled in the art that various combinations and/or modifications and variations can be made in the dialysis system depending upon the specific needs for operation. Moreover, features illustrated or described as being part of one embodiment may be used on another embodiment to yield a still further embodiment.

What is claimed is:

1. A system comprising:
 a dialysate flow loop for circulating a dialysate through a dialyzer,
  wherein the dialysate flow loop comprises a dialysate regeneration unit having a sorbent cartridge;
 a pH-buffer management system for adding or generating a pH-buffer modifying solution to the dialysate,
  wherein the pH-buffer modifyinq solution has a different pH from the dialysate;
  wherein the pH-buffer management system comprises a bipolar electrodialysis system for at least acidifying the dialysate;
 a degasser module configured to remove at least carbon dioxide generated by the bipolar electrodialysis system; and
 a controller programmed for calculating an amount of the pH-buffer modifying solution for addition to the dialysate to adjust the dialysate to be of a predetermined pH and bicarbonate buffer concentration,
  wherein the controller is further programmed to determine an amount of bicarbonate generated by the dialysate regeneration unit due to a urea concentration of the dialysate upstream of the dialysate regeneration unit.

2. The system of claim 1, wherein the pH-buffer management system comprises an infusate system configured to add a bicarbonate buffer component or unbuffered sodium bicarbonate to the dialysate.

3. The system of claim 1, wherein the controller is programmed to determine the predetermined pH and bicarbonate buffer concentration based at least in part on an acid/base chemistry of a patient.

4. The system of claim 1, wherein a feed into the bipolar electrodialysis system comprises an ultrafiltrate.

5. The system of claim 1, wherein a feed into the bipolar electrodialysis system comprises a dialysate.

6. The system of claim 1, wherein the controller is programmed to determine a pH and a buffer concentration of the dialysate to determine an addition rate of the pH-buffer modifying solution into the dialysate.

7. The system of claim 1, wherein the controller sets an addition rate of the pH-buffer modifying solution into the dialysate at least in part based on the amount of bicarbonate generated by the dialysate regeneration unit.

8. The system of claim 1, wherein the degasser module removes carbon dioxide undissolved within the dialysate to a certain level to achieve a specific dialysate pH.

9. The system of claim 1, wherein the degasser module removes carbon dioxide dissolved within the dialysate to a certain level to achieve a specific dialysate pH.

10. A method comprising:
 adding a pH-buffer modifying solution into a dialysate in a dialysate flow loop downstream of a dialyzer and upstream of a dialysate regeneration unit comprising a sorbent cartridge,
  wherein an addition rate of the pH-buffer modifying solution into the dialysate is set to adjust the dialysate to be of a predetermined pH and bicarbonate buffer concentration;
  wherein the pH-buffer modifying solution is added from a pH-buffer management system,
   wherein the pH-buffer management system comprises a bipolar electrodialysis system for at least acidifying the dialysate;
 determining an amount of bicarbonate generated by the dialysate regeneration unit due to a urea concentration of the dialysate upstream of the dialysate regeneration unit; and
 removing, via a deqasser, carbon dioxide generated by the bipolar electrodialysis system from the dialysate.

11. The method of claim 10, wherein the pH-buffer management system comprises an infusate system configured to add a bicarbonate buffer component or unbuffered sodium bicarbonate to the dialysate.

12. The method of claim 10, further comprising determining the predetermined pH and bicarbonate buffer concentration based at least in part on an acid/base chemistry of a patient.

13. The method of claim 10, wherein a feed into the bipolar electrodialysis system comprises an ultrafiltrate.

14. The method of claim 10, wherein a feed into the bipolar electrodialysis system comprises a dialysate.

15. The method of claim 10, further comprising determining a pH and a buffer concentration of the dialysate prior to addition of the pH-buffer modifying solution to determine an addition rate of the pH-buffer modifying solution into the dialysate.

16. The method of claim 10, further comprising setting an addition rate of the pH-buffer modifying solution into the dialysate at least in part based on the amount of bicarbonate generated by the dialysate regeneration unit.

17. A system comprising:
 a dialysate flow loop for circulating a dialysate through a dialyzer,
  wherein the dialysate flow loop comprises a dialysate regeneration unit having a sorbent cartridge;
 a pH-buffer management system for adding a pH-buffer modifying solution to the dialysate,
  wherein the pH-buffer modifying solution has a different pH from the dialysate;
 a degasser module configured to remove carbon dioxide within the dialysate to a certain level to achieve a specific dialysate pH,
  wherein the degasser module is downstream from the pH-buffer management system and the sorbent cartridge; and
 a controller programmed for calculating an amount of the pH-buffer modifying solution for addition to the dialysate to adjust the dialysate to be of a predetermined pH and bicarbonate buffer concentration.

* * * * *